(12) United States Patent
Gunst et al.

(10) Patent No.: US 7,891,478 B2
(45) Date of Patent: Feb. 22, 2011

(54) COIN COLLECTING MACHINE AND COIN BIN

(75) Inventors: Robert E. Gunst, Neosho, WI (US); Myron W. Spoehr, Lake Mills, WI (US); Joseph P. Hanus, Watertown, WI (US); Jason R. Parpart, Whitewater, WI (US)

(73) Assignee: Talaris, Inc., Watertown, WI (US)

( * ) Notice: Subject to any disclaimer, the term of this patent is extended or adjusted under 35 U.S.C. 154(b) by 155 days.

(21) Appl. No.: 12/376,987

(22) PCT Filed: Aug. 14, 2007

(86) PCT No.: PCT/US2007/017969

§ 371 (c)(1),
(2), (4) Date: Feb. 10, 2009

(87) PCT Pub. No.: WO2008/021352

PCT Pub. Date: Feb. 21, 2008

(65) Prior Publication Data

US 2010/0155193 A1 Jun. 24, 2010

Related U.S. Application Data

(63) Continuation-in-part of application No. 11/690,436, filed on Mar. 23, 2007, now abandoned.

(60) Provisional application No. 60/822,330, filed on Aug. 14, 2006.

(51) Int. Cl.
G07F 9/10 (2006.01)

(52) U.S. Cl. ............... 194/350; 194/353; 188/5; 188/19; 188/23; 280/47.17; 280/47.34

(58) Field of Classification Search ............... 280/43.1, 280/47.34, 47.17; 194/350, 353; 188/5–7, 188/19, 23
See application file for complete search history.

(56) References Cited

U.S. PATENT DOCUMENTS

| | | | |
|---|---|---|---|
| 2,421,405 A | 1/1945 | Benning | |
| 5,573,078 A | 11/1996 | Stringer et al. | |
| 6,082,519 A | 7/2000 | Martin et al. | |
| 6,119,889 A * | 9/2000 | Fujii et al. | 220/592.27 |
| 7,337,890 B2 * | 3/2008 | Bochonok et al. | 194/353 |
| 2006/0144670 A1 | 7/2006 | Gunst et al. | |

* cited by examiner

*Primary Examiner*—Jeffrey A Shapiro
(74) *Attorney, Agent, or Firm*—Boyle Fredrickson, S.C.

(57) ABSTRACT

A moveable coin bin assembly for holding a plurality of coins is disclosed. The moveable coin bin includes a coin bin housing (121) for receiving coins, the coin bin housing being disposed on wheels (124, 126) for movement, a handle assembly (228) including an elongated handle (232, 234) having an upper end for gripping (230) and a lower end for coupling and de-coupling to the coin bin housing. The handle assembly (228) further includes a latching and retaining mechanism (240) for coupling to the coin bin housing in a motion along a floor, wherein said latching and retaining mechanism is releasable by a user to de-couple the handle assembly from the coin bin housing. The coin bin (122) includes a brake system that can be selectively applied by a detachable handle (228). The bin (122) can be used with a coin collecting machine (10) includes a motorized funnel system (63) for funneling coins to a plurality of coin collecting apertures (170, 172) in the bin for even distribution.

5 Claims, 20 Drawing Sheets

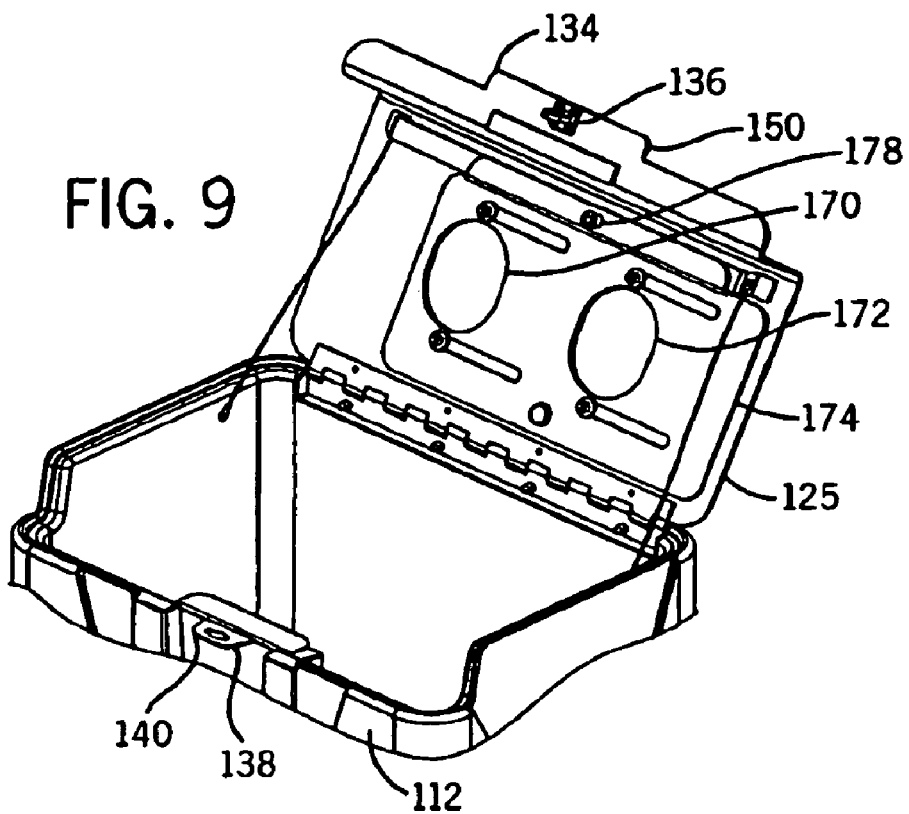
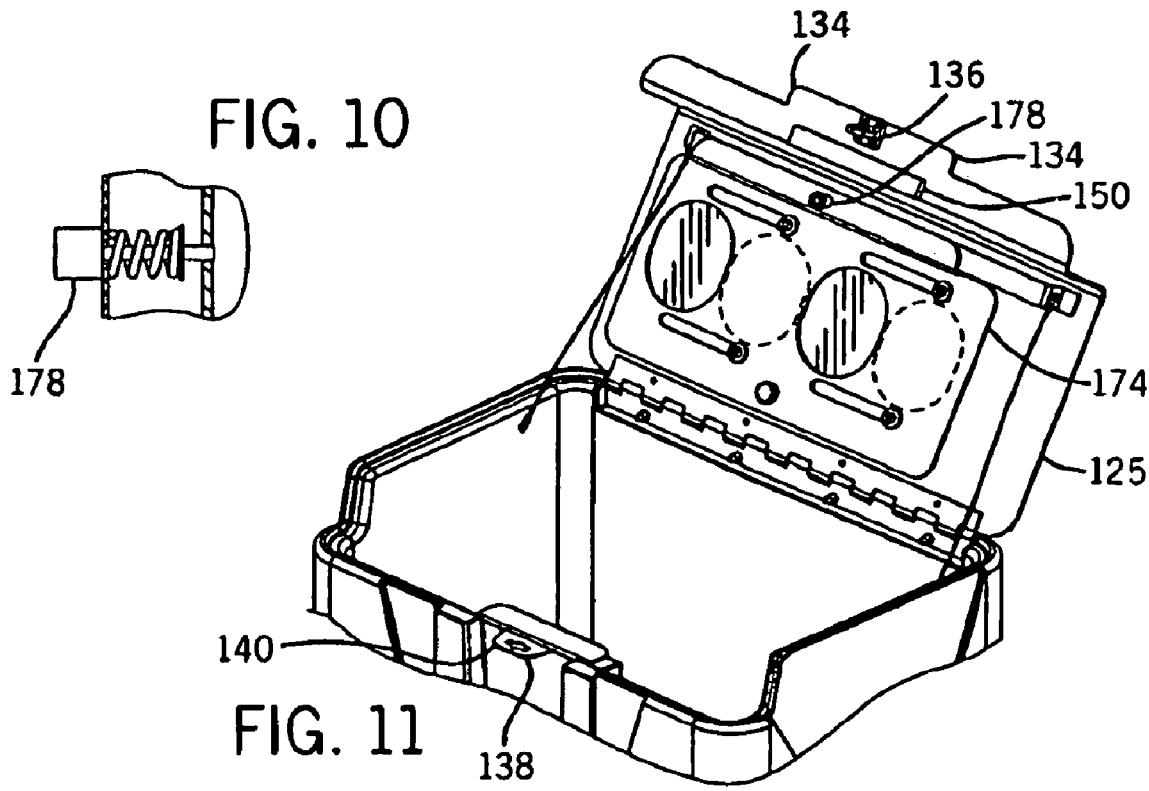

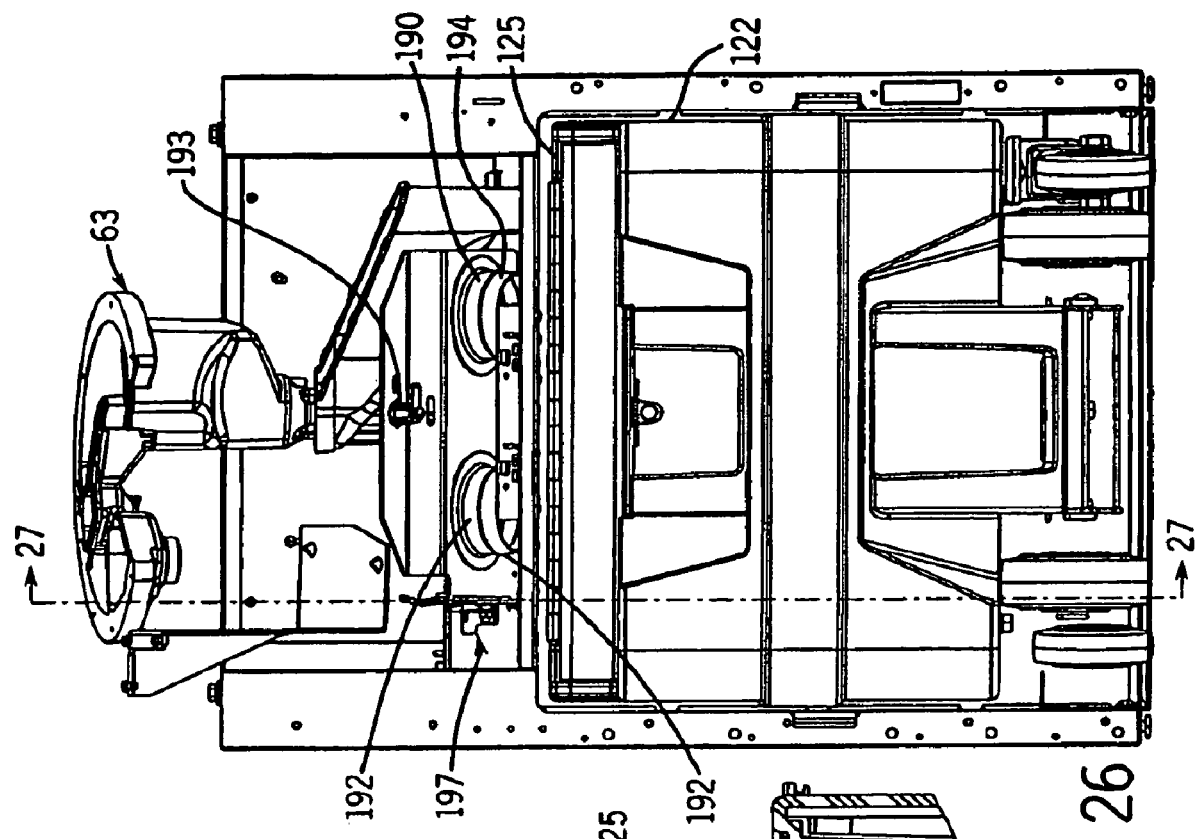
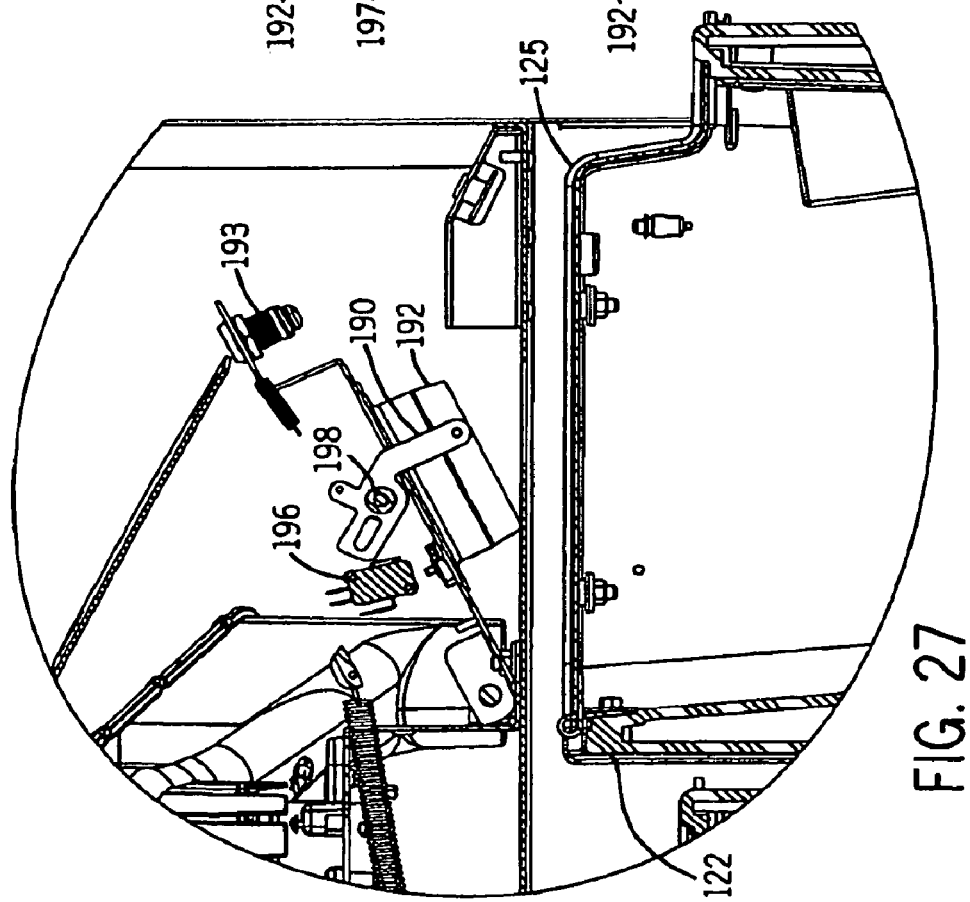
FIG. 26
FIG. 27

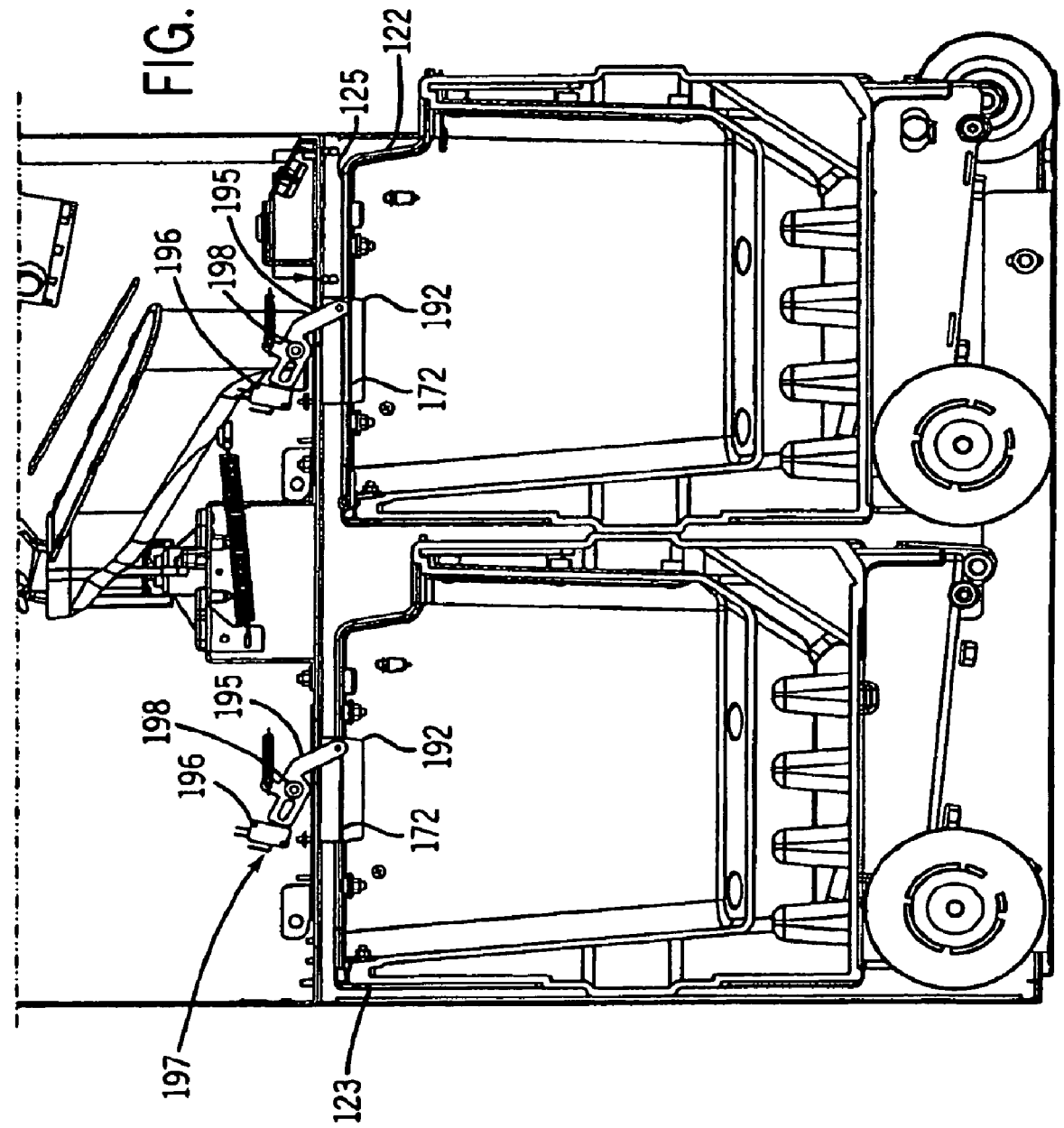

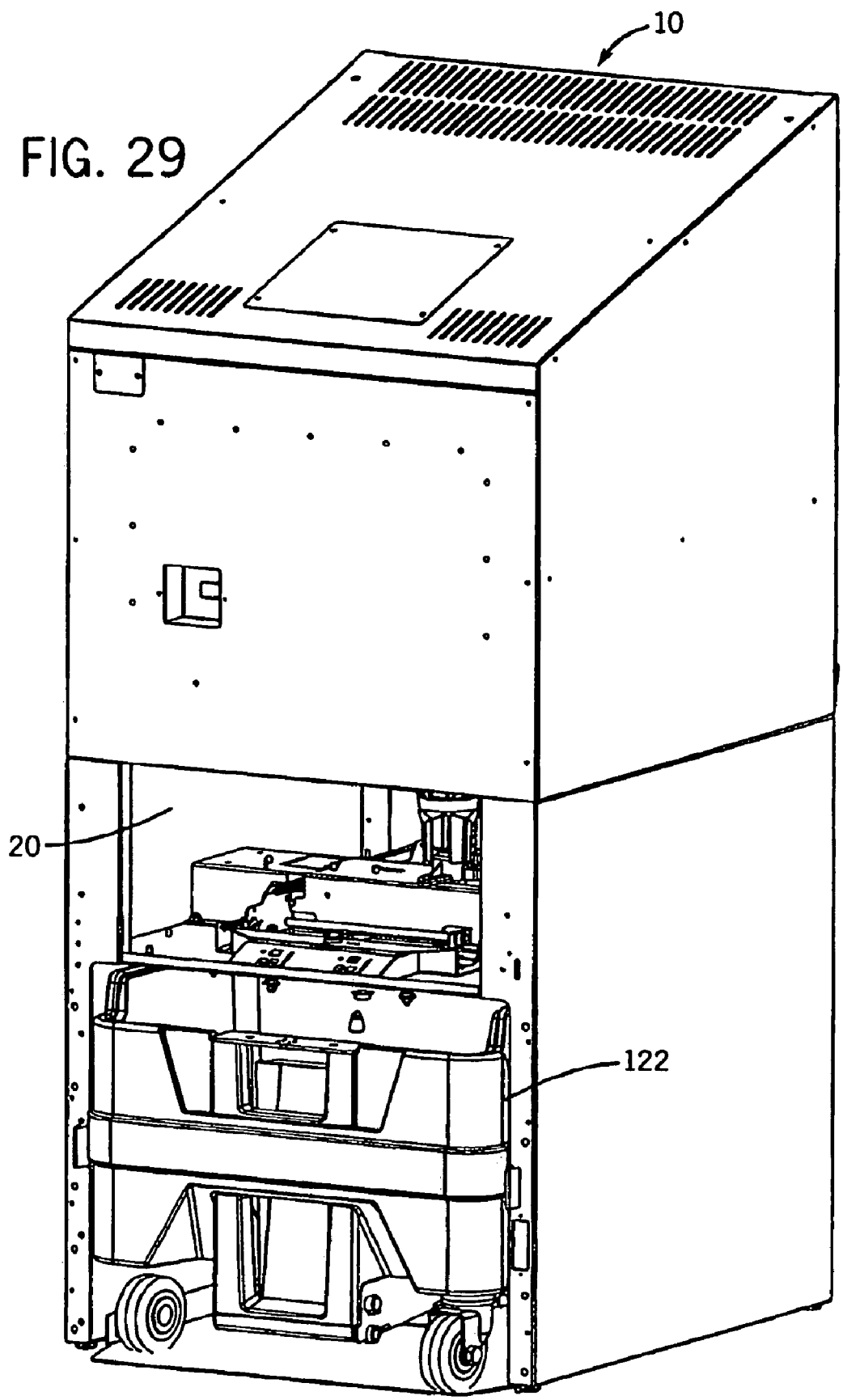

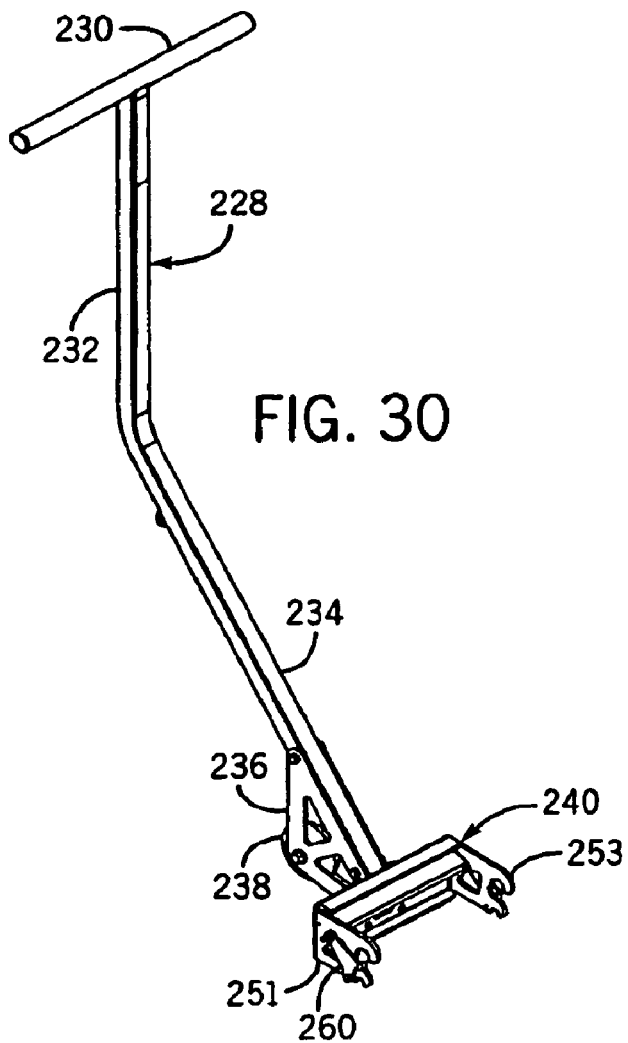
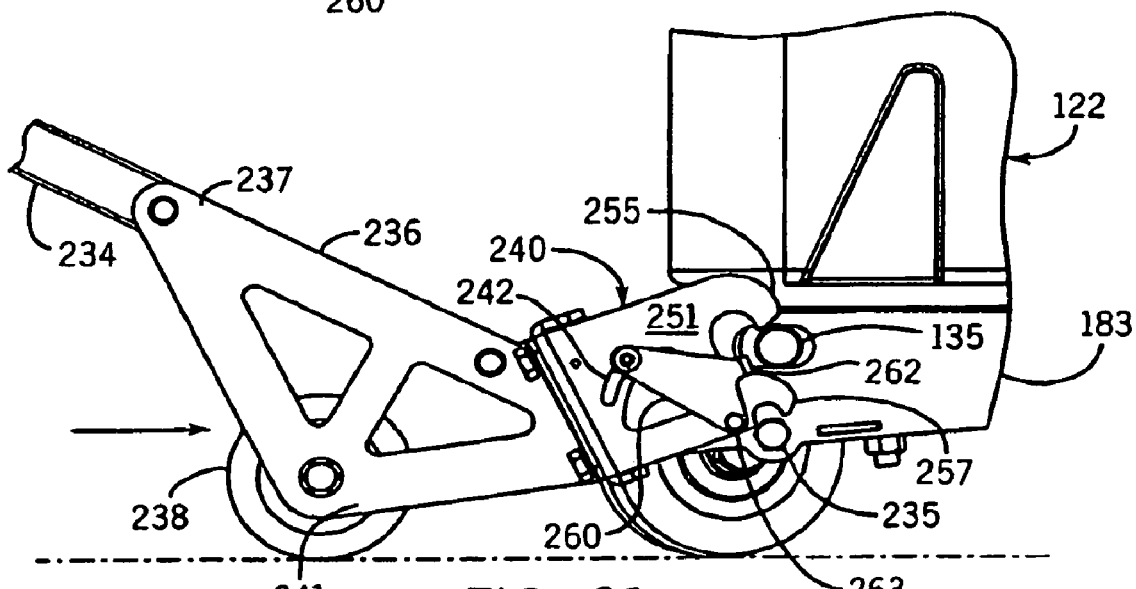

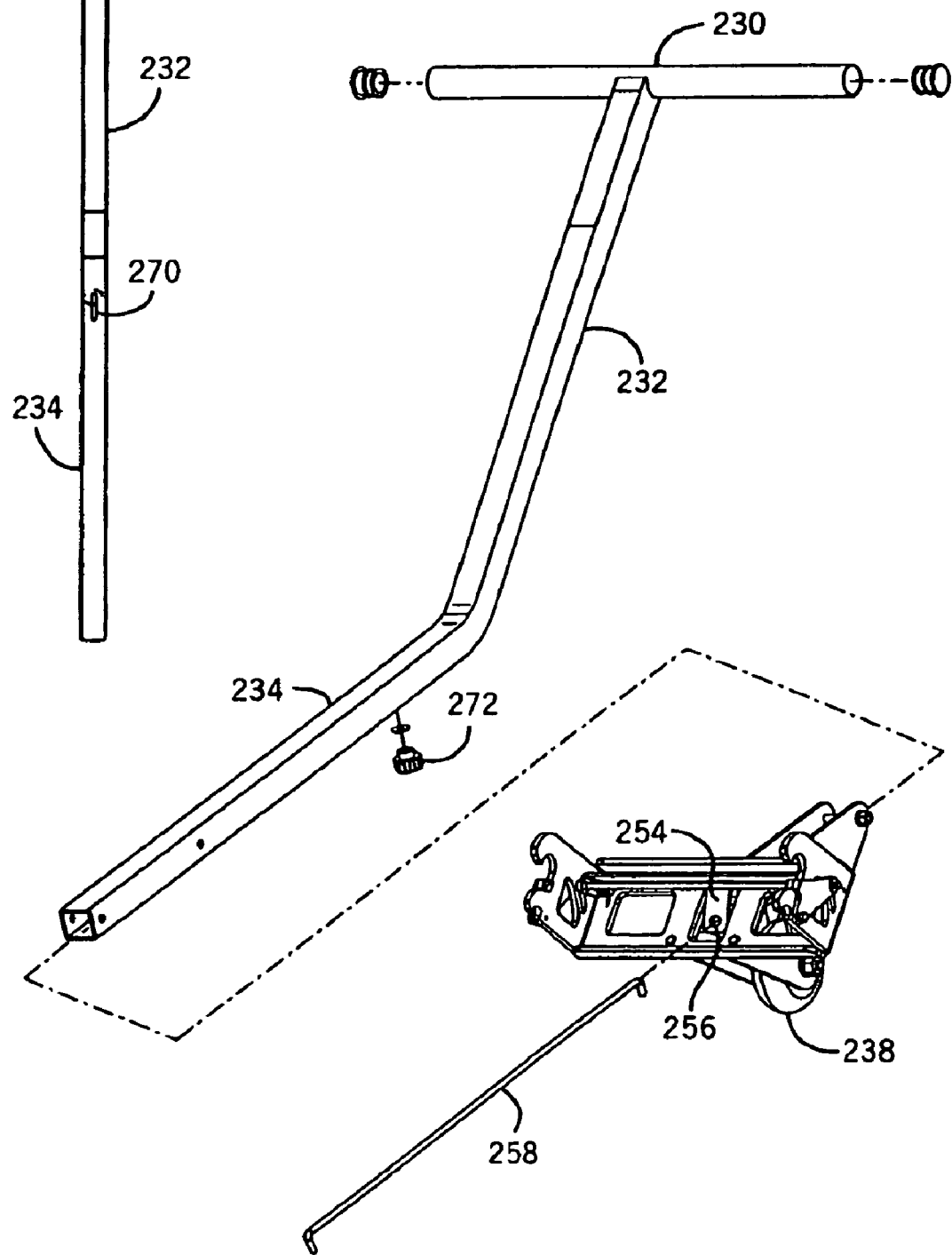

COIN COLLECTING MACHINE AND COIN BIN

CROSS-REFERENCE TO RELATED APPLICATIONS

This application claims the benefit of U.S. Provisional Patent Application No. 60/822,330 filed Aug. 14, 2006, and is a continuation-in-part of U.S. patent application Ser. No. 11/690,436 filed Mar. 23, 2007 now abandoned.

FIELD OF THE INVENTION

The present invention is directed to a coin bin, and more specifically, to a coin bin for use in an automated coin collection machine.

BACKGROUND

Coin collecting machines, such as coin redemption machines, automated teller machines (ATMs), vending machines, gaming machines, and toll booth machines, include coin storage devices or bins for collecting the coins inserted into the machines. To allow for efficient use of the machine, bins are designed to capture a significant number of coins. For example, bins can be constructed to store the average number of coins used during a single shift or during an entire day. At the end of each shift or day of operation, the coin bin is typically removed from the coin collecting machine to allow the coins to be processed or deposited into an account.

To increase efficiency and limit costs, it is desirable for the coin bin to be handled by a single person, even someone not skilled in moving coins. The coin bins, however, can be extremely heavy, particularly when full. Full bins can, in fact, weigh hundreds of pounds, and are therefore difficult to handle based merely on their weight. Complicating this issue, also due to the weight, the bins pick up speed quickly and easily when on a ramped or sloped surface. The bins, moreover, are typically located in hard-to-access areas inside of the coin collecting machine, and can be difficult to access and retrieve. The coins, moreover, are typically piled in a single location in the bin, and therefore may cause instability when the bin is moved. Therefore, maneuvering the bins into and out of a coin collecting machine can be difficult.

It is desirable, therefore, to provide a coin bin that is easy to maneuver, that can be steered over a wide angle, and that is easy to brake or stop in a safe and automatic manner. The bin, moreover, must be easy to store within a confined area. It is also desirable to provide multiple bins within the storage area, to distribute the weight of the coins, and therefore to be able to arrange the bins in tandem or other configurations. The present invention addresses these issues.

SUMMARY OF THE INVENTION

The present invention provides a moveable coin bin assembly for holding a plurality of coins. The moveable coin bin assembly comprises a coin bin housing for receiving coins that is disposed on wheels for movement, and a handle assembly including an elongated handle having an upper end for gripping and a lower end for coupling and de-coupling to the coin bin housing. The handle assembly further includes a latching and retaining mechanism for coupling to the coin bin housing in a motion along a floor. The latching and retaining mechanism is releasable by a user to de-couple the handle assembly from the coin bin housing.

In another aspect of the invention, the latching and retaining mechanism forms two spaced apart arms each with a pair of spaced apart hooked retainers that are coupled to coin bin housing to form a retainer mechanism. The latching and retaining mechanism also includes a spring-operable latching mechanism that is received in the retaining mechanism after the hooked retainers have been coupled to the coin bin housing. The handle assembly can include a release mechanism for gripping along a mid portion of the handle to withdraw the latching mechanism from the retainer mechanism and allow the handle assembly to be withdrawn from the coin bin housing.

In yet another aspect of the invention, a moveable coin bin for holding a plurality of coins is provided. The bin includes a housing for receiving a plurality of coins, and at least a portion of the housing comprises sidewalls having a double-walled construction for limiting noise during the coin collecting process. The housing is disposed on wheels, and includes a handle that is detachably coupled to the housing.

In another aspect of the invention, an outer wall of the sidewalls is formed with a double-walled construction has a projecting portion that extends laterally around the sidewalls of the bin to form a spacer and a guard member with respect to other adjacent coin bins. In addition, a sound deadening material can be provided between at least a portion of an inner wall and the outer wall in the double walled construction. At least a portion of the housing, moreover, can be constructed of a plastic material, and particularly of a rotationally spin-molded plastic.

In still another aspect of the invention, a moveable coin bin is provided including a housing for receiving coins, a wheel assembly coupled to the housing, and a handle, detachably coupled to the wheel assembly. A braking element is coupled to the handle, and the handle moves the braking element between a braked position in which the braking element contacts a surface in the wheel assembly to limit the motion of the wheel and a brake release position in which the braking element is separated from the surface in the wheel assembly.

In yet still another aspect of the invention, a coin collecting machine is provided. The machine includes a cabinet including an upper and a lower portion. A coin sorting mechanism is provided in the upper portion of the cabinet including an output for directing sorted coins from the coin sorting mechanism. A coin collecting bin is movably provided in a lower portion of the cabinet and positioned beneath the coin sorting mechanism to receive coins, and includes a plurality of coin collecting apertures for receiving coins. A motorized drive for positioning the output of the coin sorter, wherein the output of the coin sorter is positionable adjacent each of the coin collecting apertures in the coin bin for distributing the coins evenly in the bin.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 9 is a partial perspective view of the lid in an open position, with the apertures open.

FIG. 10 is a cutaway side view of the lid illustrating a spring loaded plunger received in an aperture for locking the lid.

FIG. 11 is a partial perspective view of the bin of FIG. 1 with the lid in an open position and with the apertures closed.

FIG. 26 is a front view of the machine of FIG. 22, with coin bins received in the lower compartment, and with the fill tray in an open position.

FIG. 27 is a cutaway view taken along line 27-27 of FIG. 26.

FIG. 28 is a cutaway side view of the machine of FIG. 26.

FIG. 29 is a rear view of an alternate embodiment of a coin collecting machine constructed in accordance with the present invention having a rear access door.

FIG. 30 is a perspective view of a second embodiment of a handle for use with a coin bin.

FIG. 31 is a side view of the handle of FIG. 30 approaching a coin bin to be attached to the coin bin.

FIG. 33 is an exploded view of the major components of the handle of FIG. 30, particularly illustrating a release mechanism.

FIG. 34 is a back view of the handle of FIG. 33.

DETAILED DESCRIPTION OF THE PREFERRED EMBODIMENTS

Figure 1:
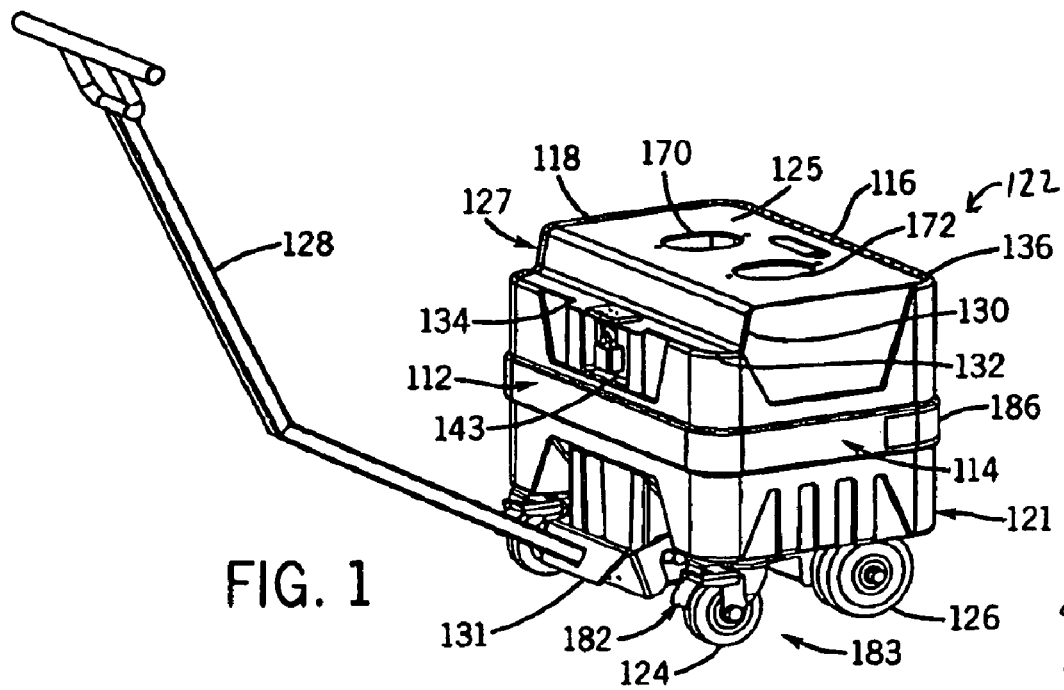
FIG. 1 is a corner perspective view of a coin bin constructed in accordance with the present invention.

Referring now to the Figures, and more particularly to FIG. 1, a coin bin 122 constructed in accordance with the present invention is shown. The coin bin 122 comprises a housing 121 having one or more opening 170, 172 for receiving a plurality of coins, which typically comprises a mass of mixed denomination coins collected over an extended period of time, such as a shift or a day, until a predetermined weight is reached, or until a predetermined level is reached in the bin 122, and which can weigh tens or hundreds of pounds. The bin 122 is coupled to a wheel assembly 183 including two sets of wheels, a pair of front wheels 124 provided at the front end of the bin 122, and a pair of rear wheels 126 provided at the back end of the bin 122. A handle 128 is detachably connected to the front end of the bin 122, and more specifically to the wheel assembly 183, as described more fully below.

Referring still to FIG. 1, the housing 121 of the coin bin 122 includes four side walls 112, 114, 116, and 118, including a front side 112 and back side 116, and an open top that is selectively enclosed by a hinged lid 125. The lid 125 includes a rectangular planar section 126, hinged to the back side 116 of the housing 121, and an L-shaped lip 127 that, when the lid 125 is closed, rests on the top edge of the front side 112 of the housing 121, opposite the hinge. The L-shaped lip 127 includes a vertical section 130, and a horizontal section 132.

The housing 121 is preferably constructed of a rotationally molded plastic material, which is durable, impact resistant, light weight, sound deadening, and inexpensive. The front side 112 can include a metal plate 143, that is substantially centered between the adjacent side walls 114 and 118. The metal plate 143 can provide a mounting location for a locking mechanism, as discussed more thoroughly below. Referring now also to FIG. 31, a cutaway view through the center of the bin 122 is shown. As seen here, the rotational spin molding of the housing 121 results in outer and inner walls 182 and 184, respectively, with an open space between the walls 182 and 184. The space can be filled with sound deadening filler materials such as polyurethane to limit the noise as coins are deposited into the bin. The filler materials can be provided throughout the housing 121, but to limit the weight of the bin 122 while providing reduced noise, the filler material can also be provided in selected areas of the bin, and particularly in the floor of the housing 121. Referring again also to FIG. 1, a raised ridge 186 or projecting portion is formed extending laterally around the sidewalls forming the circumference of the housing 121, which acts essentially as a bumper for the bin 122, particularly when bin 122 is arranged in tandem with a second bin 123 as described below. The ridge 186 forms a spacer and a guard member with respect to other adjacent coin bins.

Figure 4:
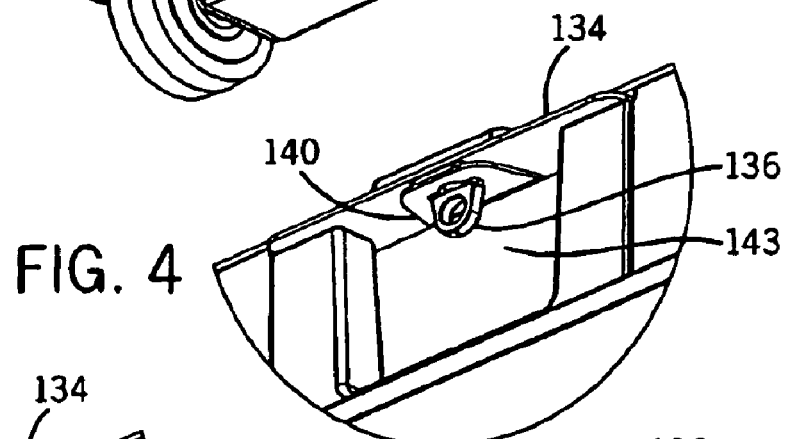
FIG. 4 is a cutaway view of the bin of FIG. 3 illustrating the locking assembly for locking the lid of the bin to the front side wall.
Figure 5:
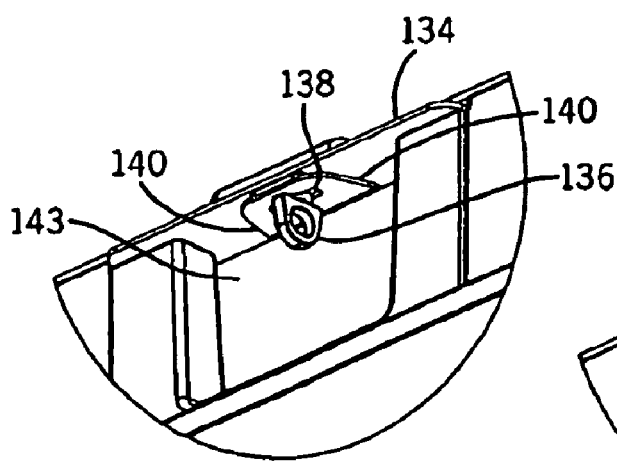
FIG. 5 is the cutaway view of FIG. 4, illustrating a hasp in a rotated position to receive a lock.
Figure 6:
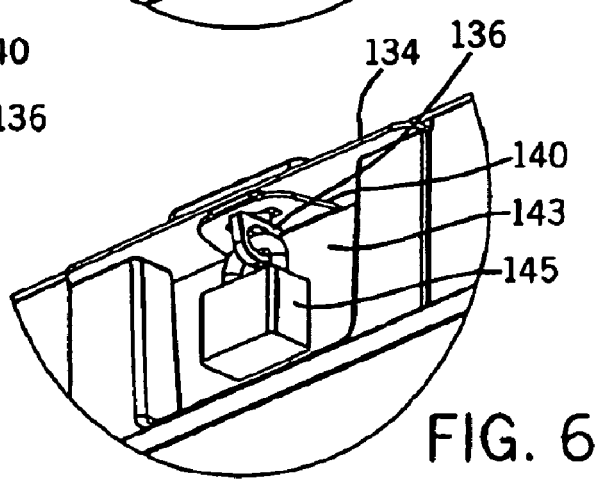
FIG. 6 is the cutaway view of FIG. 3, illustrating a padlock received on the hasp.

Referring now also to FIGS. 3-6, a ridge 134 extends from a center portion of the horizontal section 132, and a rotatable hasp 136 extends vertically from a bottom surface of the ridge 134. The hasp 136 is positioned to be received in an aperture 138 formed in a mating ridge 140 extending perpendicularly from the metal plate 143 in the front side 112 of the housing 121. Referring first to FIG. 4, the hasp 136 is initially oriented such that the longest dimension is parallel to the front wall 112 of the bin 122, and is inserted through the aperture 138. As shown in FIG. 5, the hasp 136 is subsequently rotated ninety degrees to latch the ridge 140 to the ridge 134. A locking device, such as a padlock 145 is received on the hasp 136 to lock the lid 125 to the front side 112 of the housing 121, as shown in FIG. 6. Although a rotatable hasp is shown and described here, a stationary hasp may also be used.

Figure 7:
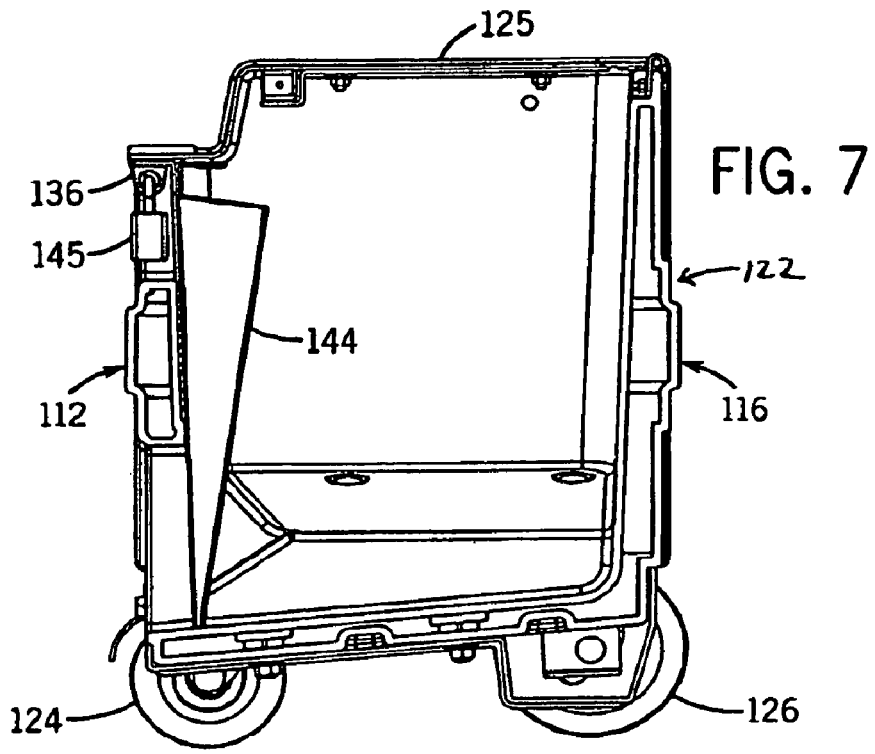
FIG. 7 is a side cutaway view through the center of the bin of FIG. 1, illustrating the internal door.
Figure 8:
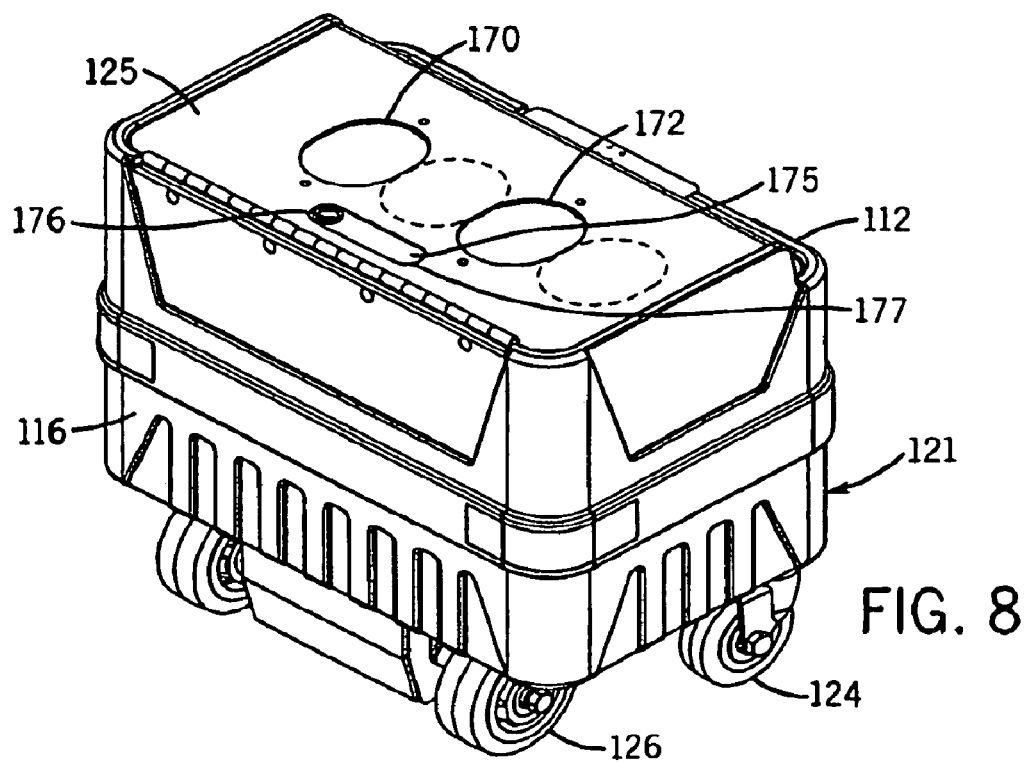
FIG. 8 is a top view of the bin of FIG. 1.

Referring again to FIG. 2 and now to FIG. 7, a coin access opening 142 is provided in the front side 112 of the housing 121, in the metal plate 143, and adjacent the floor 120 of the bin 122. The coin access opening 142 is selectively closed by a wedge-shaped door 144 that is mounted inside the housing 121, and is adapted to be moved vertically over the coin access opening 142 to selectively open and close the opening 142. The wedge-shaped door 144 is substantially vertical along a front surface 153 facing the front wall 112 of the bin 122. The back surface 155 of the door 144 is angled, sloping downward from the upper edge toward the front surface 153, meeting the front surface 153 at the bottom edge of the door 144.

Figure 2:
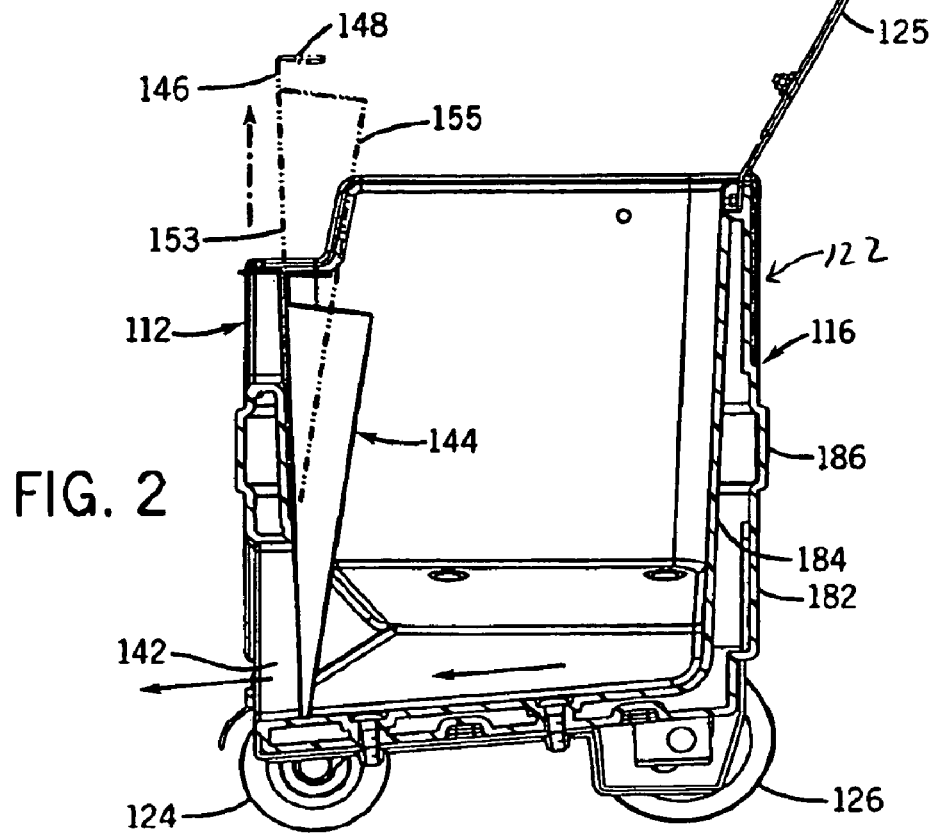
FIG. 2 is a side cutaway view through the center of the bin of FIG. 1, illustrating the sliding of a door to allow access to a coin access opening in the front of the bin.
Figure 3:
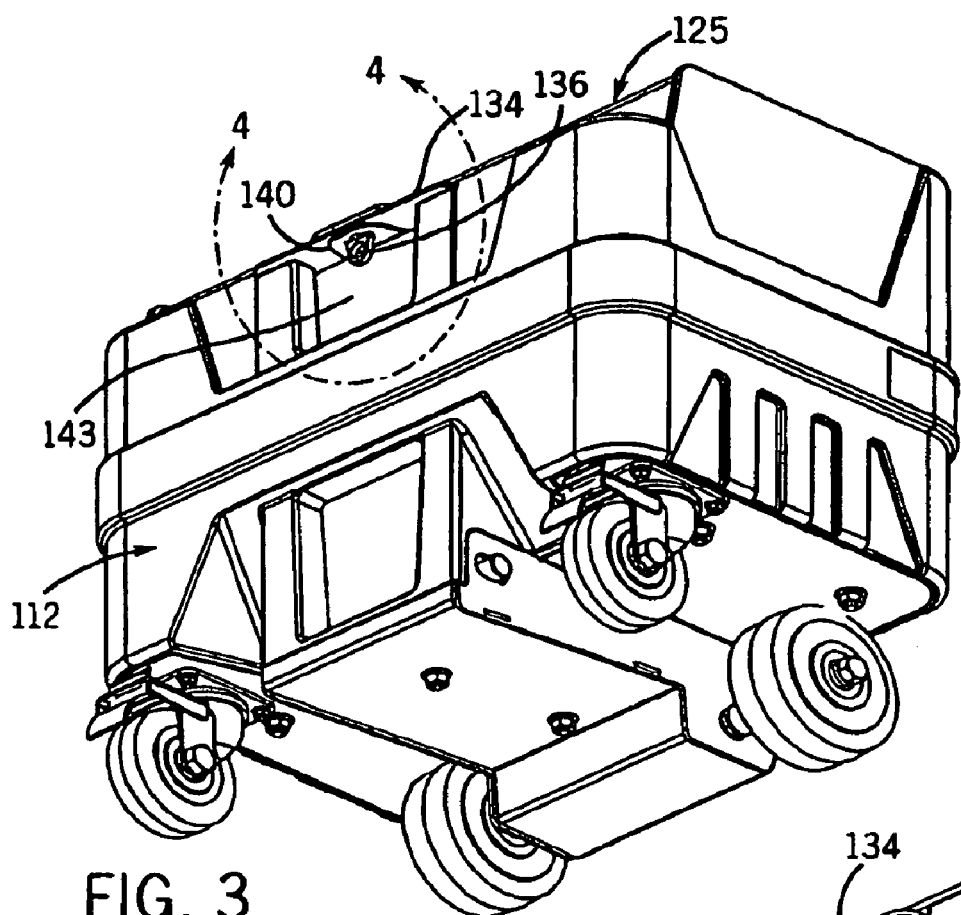
FIG. 3 is a perspective view of the bottom of the bin of FIG. 1.

Referring still to FIGS. 2 and 7, the door 144 is provided with a door handle 146 including a right angle bend 148 extending horizontally from a top edge, providing a grip for a user moving the door 144 up and down. When the hinged lid 125 is closed, a strip of foam 150 (FIGS. 9 and 10) provided under the horizontal section 132 of the L-shaped lip 127 is positioned adjacent the right angle bend 148.

When the hinged lid 125 is open, a user can grasp the door handle 146 at the right angle bend 148, and pull the door 144 vertically upward to provide access to the coin access opening 142 and to any coins in the bin. When the lid 125 is closed, however, a user cannot access the door handle 146 inside. The door 144 is, rather, maintained in a closed position by gravity. The door 144, moreover, is prevented from being moved vertically by the position of the lid 125, which prevents upward movement. As the door 144 cannot be opened, access to the coins inside of the bin 122 is prevented.

Referring again to FIG. 1 and also to FIGS. 8-11, as described above, the lid 125 also includes two coin apertures 170 and 172 for receiving coins when the bin is positioned in a coin collecting machine 10 (FIG. 20), and for distributing the coins evenly in the bin 122. The coin apertures 170 and 172 are selectively opened and closed by a sliding panel 174 mounted under the lid 125. An elongate sliding element 175 including a depression 176 is coupled to one side of the sliding panel 174, and extends through a slot 177 in the lid 125. To slide the panel 174 to the closed position, in which the coin apertures 170 and 172 are covered by the sliding panel 174, a user inserts a finger into the depression 176 and pulls the sliding panel 174 until a spring loaded plunger 178 lands in a slotted hole (not shown). When the spring loaded plunger 178 is received in the hole, a user is prevented from sliding the panel 174 in the opposite direction to re-open the coin apertures. When the coin apertures 170 and 172 are closed and the lid 125 is locked, a user opens the coin apertures 170 and 172 by unlocking the lid 125, and manually releasing the spring loaded plunger 178 from the slotted hole 180. Access to the coins inside the bin, therefore, can be selectively allowed or denied.

Figure 12:
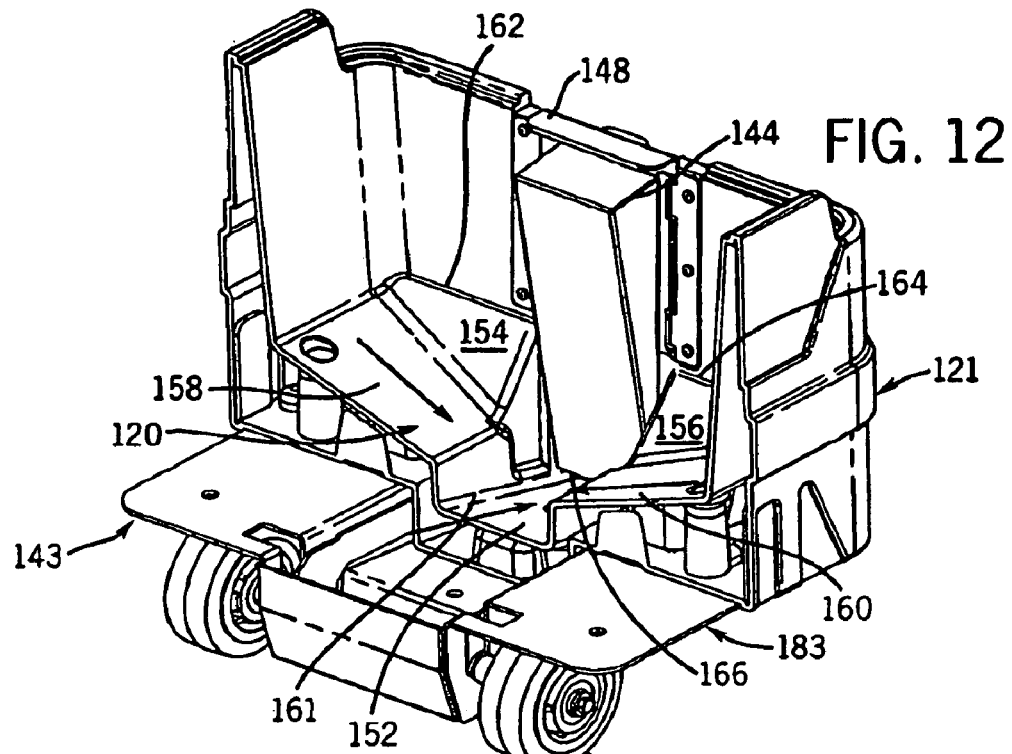
FIG. 12 is a cutaway perspective view illustrating the floor of the bin of FIG. 1.

Referring now to FIG. 12, the floor 120 inside of the bin 122 includes five separate planes: a central plane 152, right and left front side planes 154 and 156, respectively, and right and left back side planes, 158 and 160, respectively. The central plane 152 is centered in the bin 122, is of about the same width as the coin access opening 142 in the front side wall 112 of the bin 122, and has a flat bottom surface that slopes continuously from a high point, at the back 116 of the bin 122, toward the coin access opening 142 at the front side wall 112, providing a channel 161 for directing coins toward the opening 142.

The right and left rear side planes 158 and 160 slope downward toward the central plane 152 from the opposing sides 114 and 118 of the housing 121, again directing coins toward the channel 161. The right and left front side planes 154 and 156 slope downward from the front side 112 of the bin until the planes 154 and 156 meet the planes 158 and 160, respectively. The edges 162, 164, and 166 formed between the central plane 152, the right front side plane 154 and the left front side plane 156 and the front side wall 112 of the bin, respectively, are each substantially horizontal. The door 144 is of substantially the same width as the channel 161 and the coin access opening 142, and when the door 144 is removed from the bin 122, the slope of the back surface 155 of the wedge-shaped door promotes the movement of coins into the channel 161 and toward the coin access opening 142.

Figure 13:
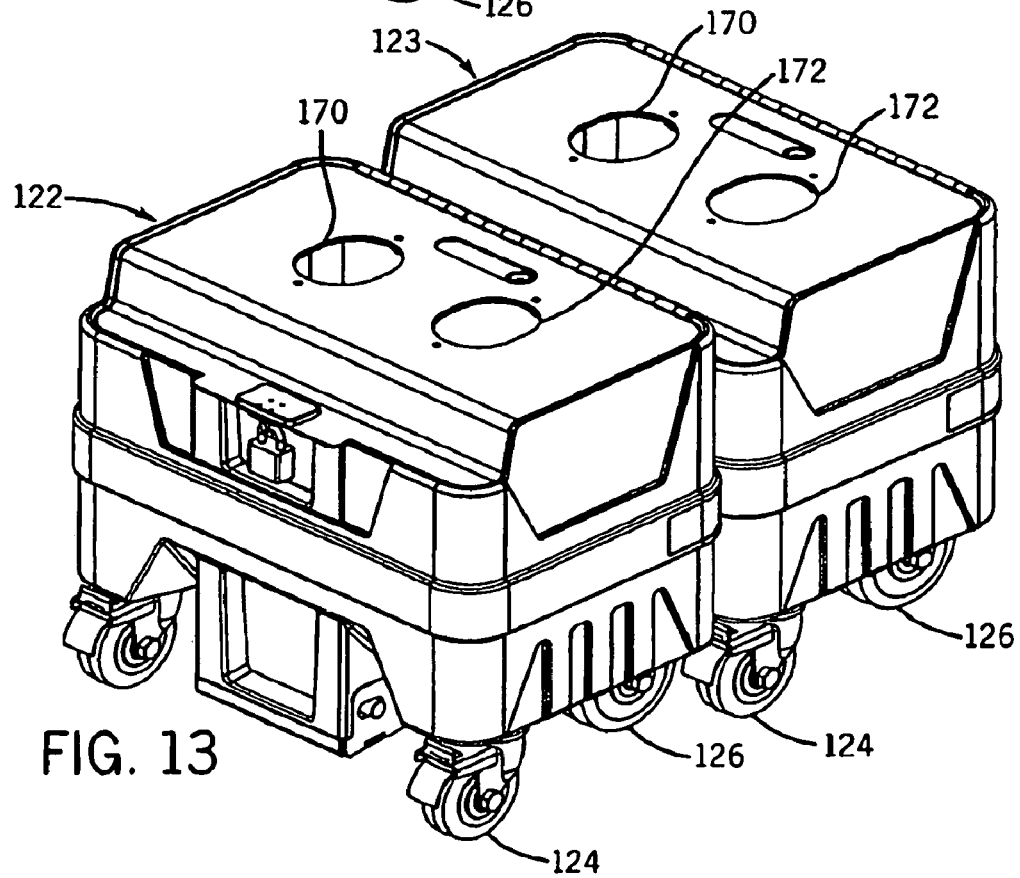
FIG. 13 is a perspective view of two of the coin bins of FIG. 1 aligned in tandem.
Figure 14:
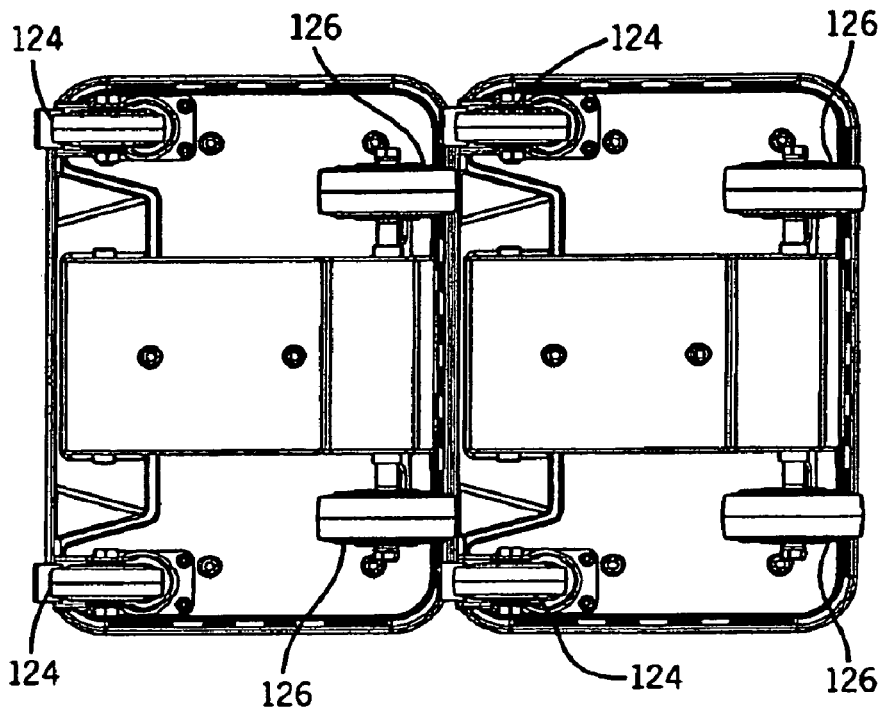
FIG. 14 is a bottom view of the tandem coin bins of FIG. 13.

Referring now to FIGS. 13 and 14, the housing 121 is mounted on a wheel assembly 183 including a pair of front wheels 124 that are positioned adjacent the side walls 114 and 118, and a pair of back wheels 126, which are offset a distance from each of the side walls 114 and 118 to allow adjacent sets of front wheels 124 and back wheels 126 to align alongside one another when the bin is stored in tandem with a second bin 123, as shown in FIGS. 13 and 14.

Figure 15:
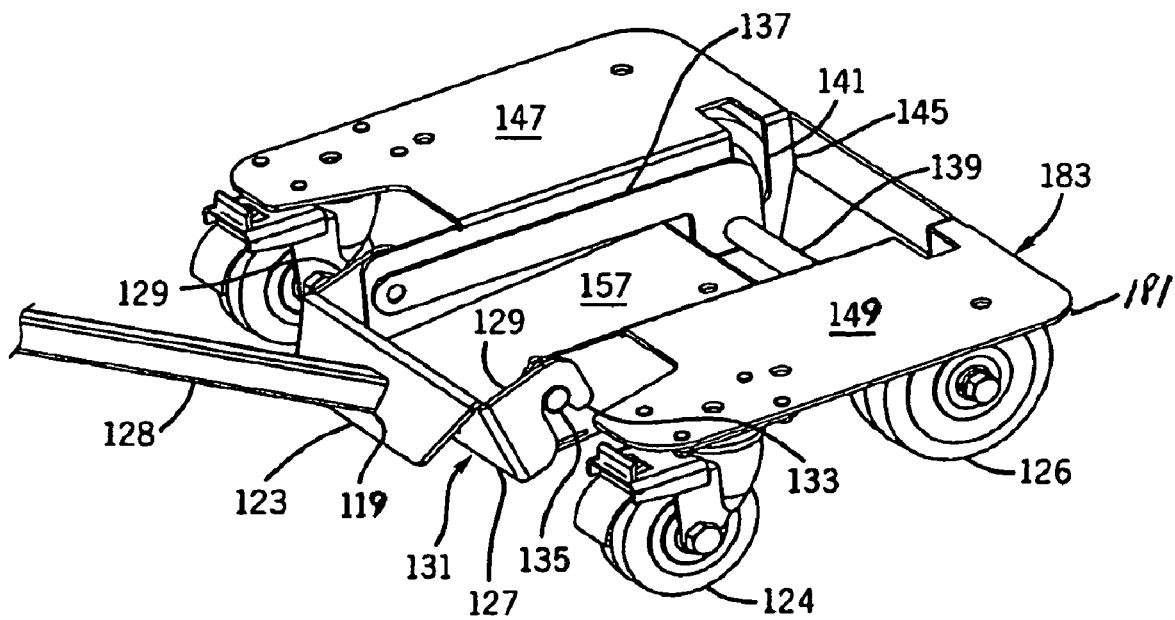
FIG. 15 is a perspective view of a wheel assembly of the coin bin of FIG. 1.
Figure 16:
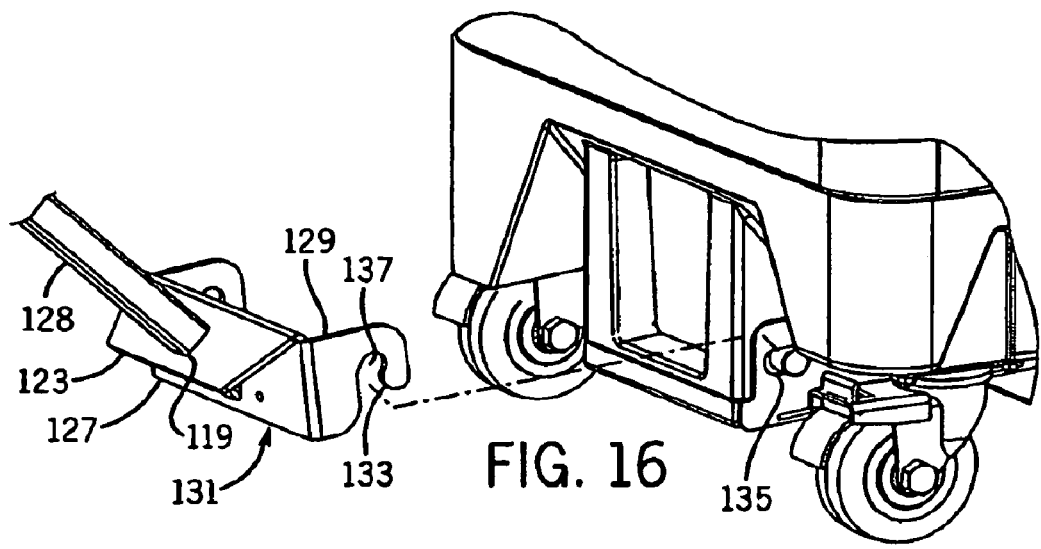
FIG. 16 is an exploded view of the coin bin of FIG. 1 and the removable handle.

Referring now to FIG. 15, the wheel assembly 183 includes a housing 181 comprising right and left wheel mounting plates 147 and 149 on opposing sides of a center channel 151 bounded by right and left vertically-extending sides 145. The front sets of wheels 124 are coupled to the mounting plates 147 and 149, and a pair of pins 135 extend from the opposing sides 145 of the assembly 183 to receive a removable coupling device 131 coupled to a handle 128. Referring now also to FIG. 1 and FIGS. 15-18, the removable coupling device 131 includes a center plate 127 and right and left side plates 129. Each of the side plates 129 includes a hook-shaped portion 133 that defines an opening 137 for receiving the pins 135. The removable coupling device 131 further includes a handle mounting plate 123 that is angled downward from a top edge of the center plate 127, and includes an aperture 119 sized and dimensioned to receive the handle 128. The removable coupling device 131 can be selectively installed onto the pins 135, as shown in FIG. 16, and removed to allow the handle to be stored.

Figure 17:
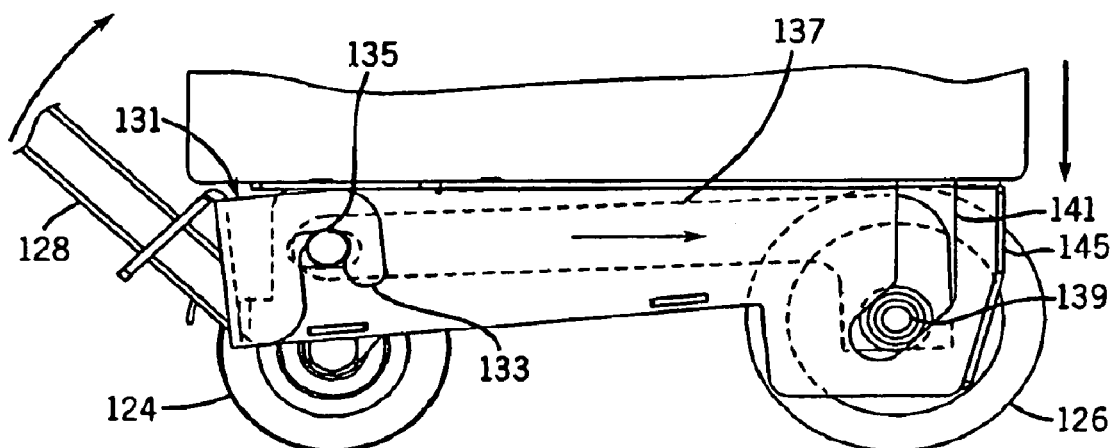
FIG. 17 is a cutaway side view of the coin bin of FIG. 1, illustrating the position of the handle in the braking position.
Figure 18:
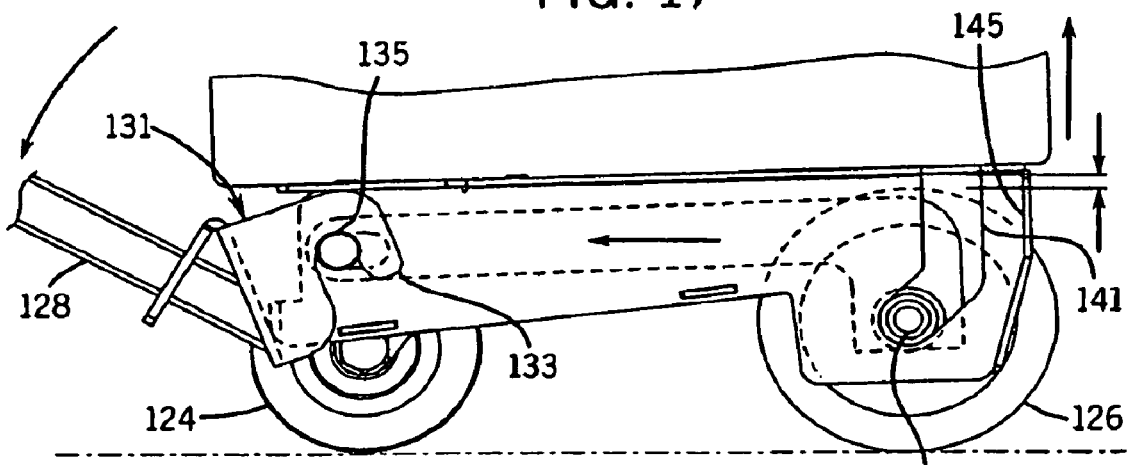
FIG. 18 is a cutaway side view of the coin bin of FIG. 1, illustrating the position of the handle in the moving position.

Referring still to FIG. 15, and also to FIGS. 16-18, the sides 145 of the wheel assembly each include a slot 141 which, referring now specifically to FIG. 17, includes a lower portion that is angled on a diagonal. An axle 139 that connects the rear wheels 126 is received in the slots 141, and is further coupled to a linkage 137 that is rotatably coupled at a first end to the pin 135 for receiving the handle 128 and associated coupling device 131. Referring now to FIG. 17, when the handle 128 is rotated upward about the pin 135, the axle 139 is forced by the linkage 137 to move along the slot 141, causing the wheels 126 to contact the substantially horizontal surfaces of the plates 147 and 149 of the wheel assembly 183, wherein the plates 147 and 149 act as braking elements, preventing the wheels 126 from rotating by the weight of the coins in the bin 122. To move the bin 122, the handle 128 is instead rotated downward, forcing the axle 139 to move along the slot 141 to the distal end of the slot 141, wherein the wheels 126 are offset a distance from the plates 147 and 149, and the braking element is removed such that the wheels 126 can rotate freely.

Figure 19:
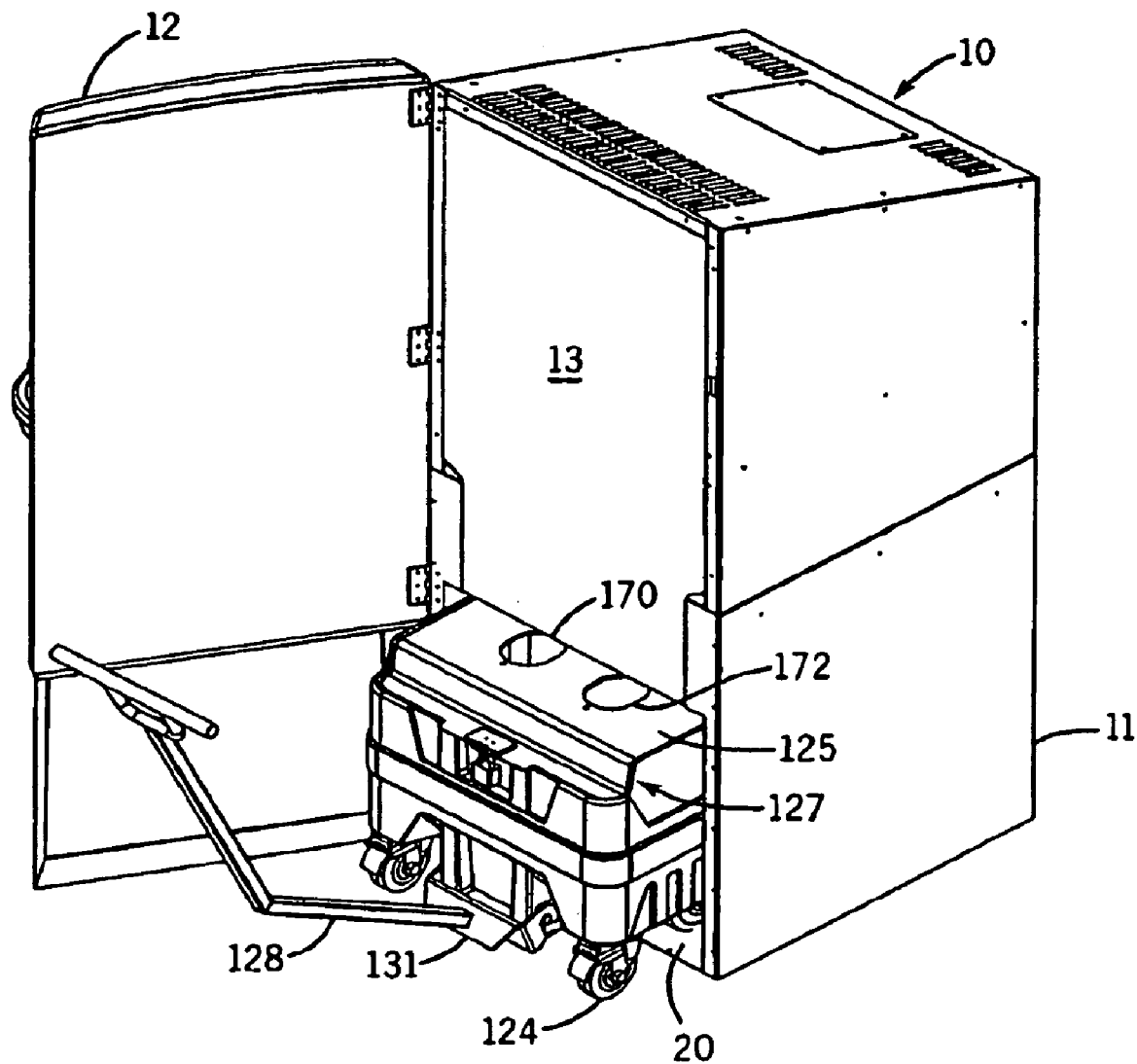
FIG. 19 is a perspective view of the coin bin of FIG. 1 as inserted into a coin collecting machine.
Figure 20:
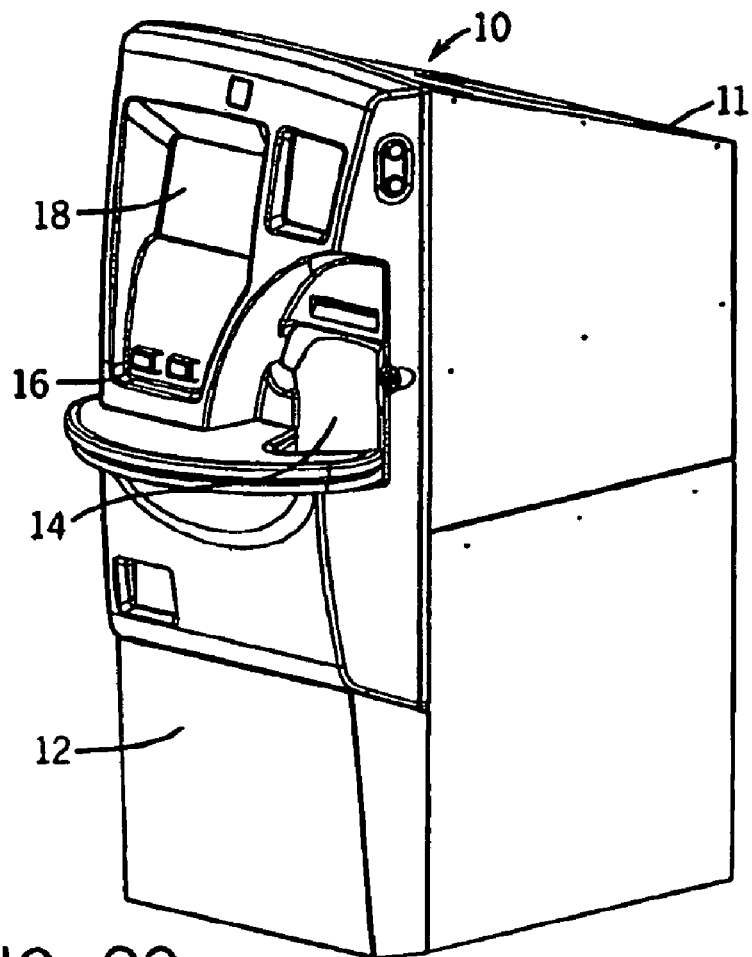
FIG. 20 is corner perspective view of coin and collecting machine that can be used with the coin bin of FIG. 1.

Referring now to FIGS. 19 and 20, a coin counting machine 10 configured to be used with the coin bin 122 of the present invention is shown. The coin counting machine 10 is provided in a cabinet 11 that includes a lower compartment 20 for receiving the coin bin 122, and an upper compartment 13 for storing internal circuitry and mechanisms (shown partially in FIG. 22) for counting coins. A door 12 of the cabinet 11 includes a display terminal 18, user input devices 16 and a coin deposit chute 14. When coins are inserted into the chute 14, the coins are counted by the internal circuitry, and are captured in the coin bin 122 stored in the lower portion 20 of the cabinet 11. The lower compartment 20 can be sized and dimensioned to receive first and second coin bins 122 and 123, which are stored in tandem.

Figure 21:
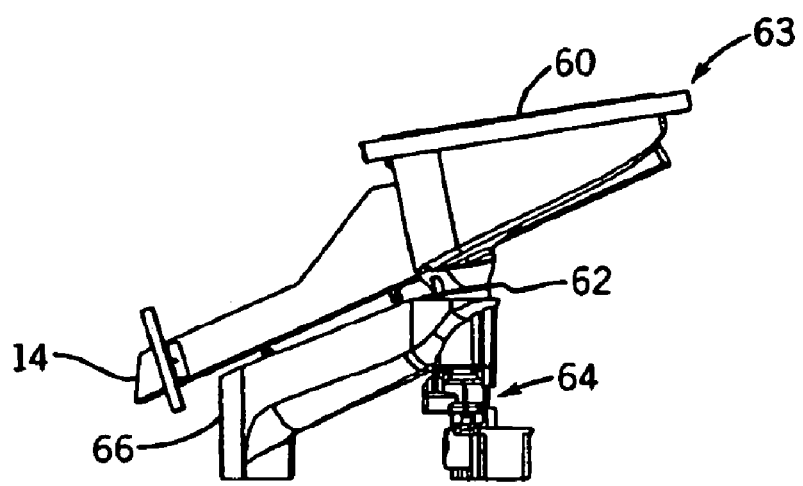
FIG. 21 is a side view of the coin bin and motor-driven funnel assembly.
Figure 22:
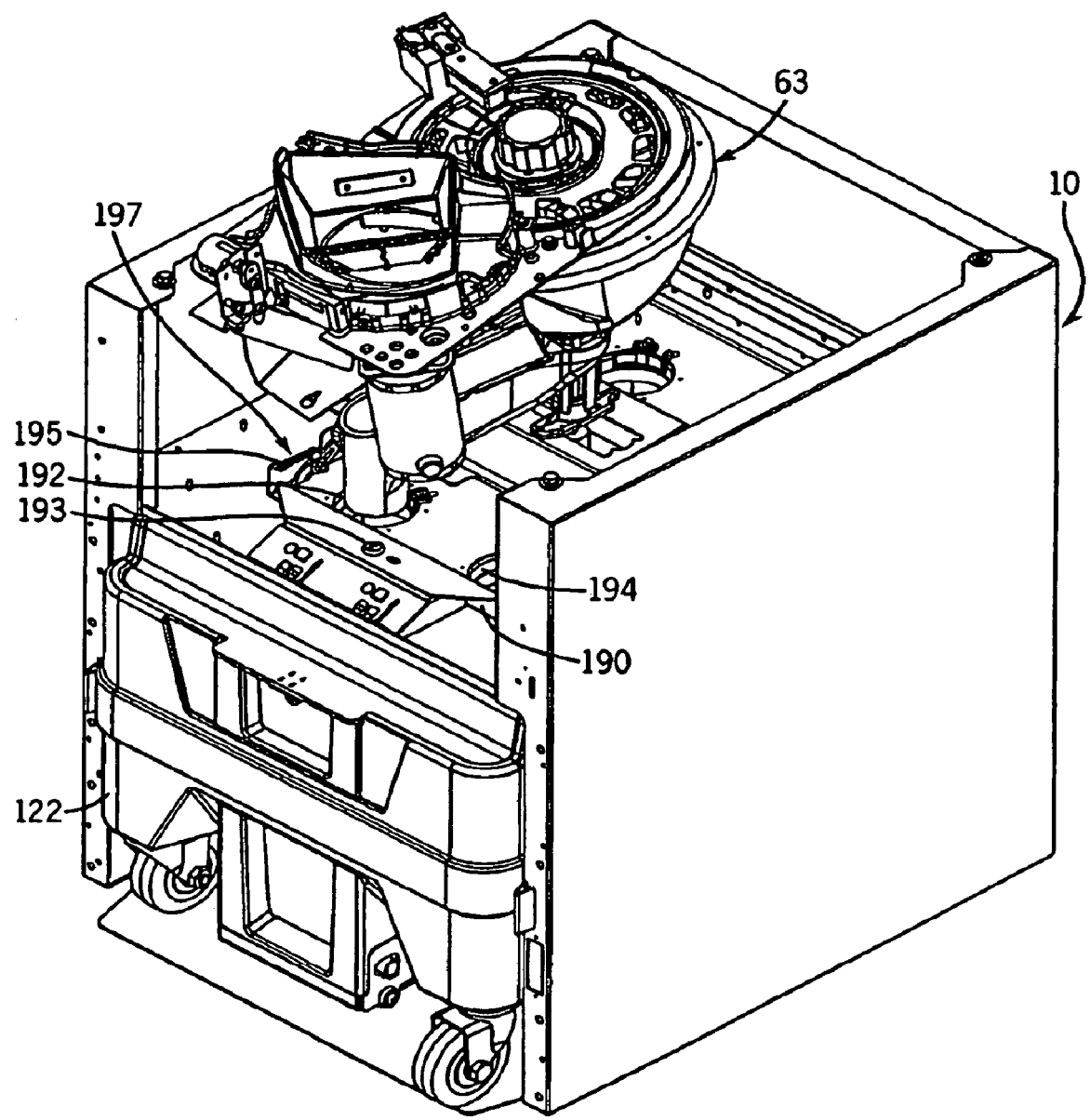
FIG. 22 is a perspective view of an alternative embodiment of a coin collecting machine with the upper portion of the cabinet removed, and illustrating a fill tray assembly.

Referring now to FIGS. 21 and 22, a motorized funnel assembly 63 is provided in the upper compartment 13 of the coin machine 10. The funnel assembly 63 includes a coin sorter 60 coupled to coin chute 14 (FIG. 20), a funnel 62, a spout 66, and a motor drive assembly 64, which together collect and sort the coins input into the coin bins 122 and 123. Coins inserted into the coin chute 14 are sorted by the coin sorter 60, which is retained in the upper compartment 13 of the cabinet 11, and are directed through the funnel 62 and to the spout 66. The output of the spout 66 is selectively positioned over one of the apertures 170 and 172 in each bin by the motor drive assembly 64, as controlled by electronic circuitry provided in the upper compartment 13 of the cabinet 11. The electronic circuitry (not shown) determines how many coins have been deposited in each port 68, 70, 72, and 74 by monitoring the number and types of coins that are deposited into the coin sorter 60 while the lower funnel 66 is positioned over a specific aperture 170 and 172. Based on these calculations, the approximate size of a pile of coins or "slump" located in a particular location can be determined, and the motor drive assembly 64 can be activated to reposition the spout 66 to assure even distribution of the coins.

Figure 23:
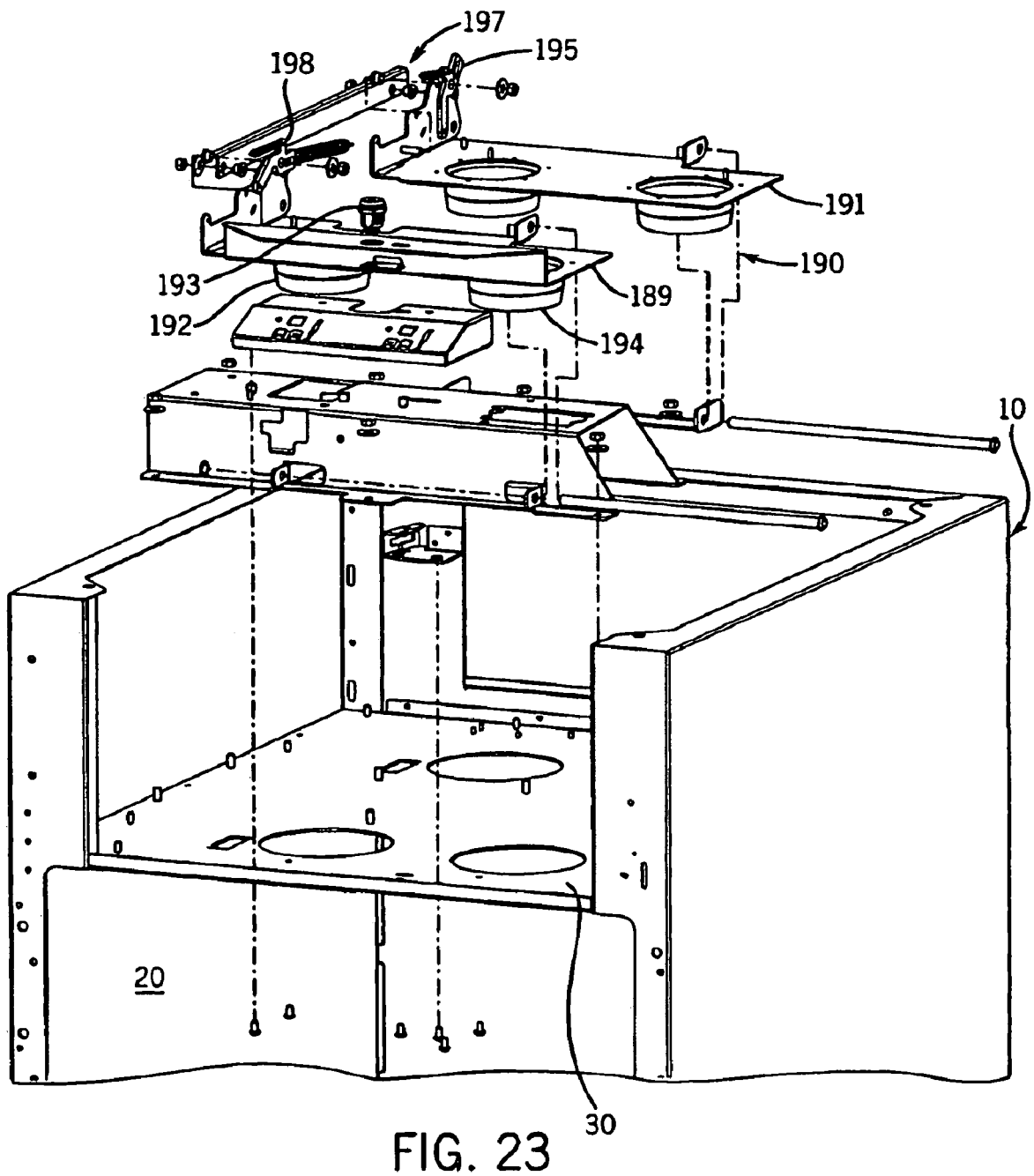
FIG. 23 is an exploded view of the fill tray assembly of FIG. 22.

Referring still to FIG. 22, the coin funneling assembly 63 directs coins to a fill tray 190, which includes tubular segments or spouts 192 and 194 for directing the coins into the apertures 170 and 172 in the bin 122, respectively. Referring now also to FIG. 23, the fill tray 190 includes a locking element 193 which, as shown here, can be a key lock, for locking the fill tray 190 to the planar member 30 separating the upper compartment 13 from the lower compartment 20 of the coin collecting machine 10. As shown here, the fill tray is constructed of two separate components 189 and 191, each including tubular elements 192 and 194. However, it will be apparent that the fill tray 190 could be constructed of a single component, or as a plurality of components.

Referring still to FIGS. 22 and 23, the fill tray 190 includes a sensing assembly 197 which is positioned along a side of the fill tray 190 to sense the position of a bin 122 or bins 122 and 123 in the machine 10. The sensing assembly 197 includes a plurality of pivoting indicator levers 195, equivalent in number to the number of bins expected to be received in the machine 10, and associated with switches 196, which are positioned to be activated by the pivoting indicator levers 195 when the levers 195 are rotated.

Figure 24:
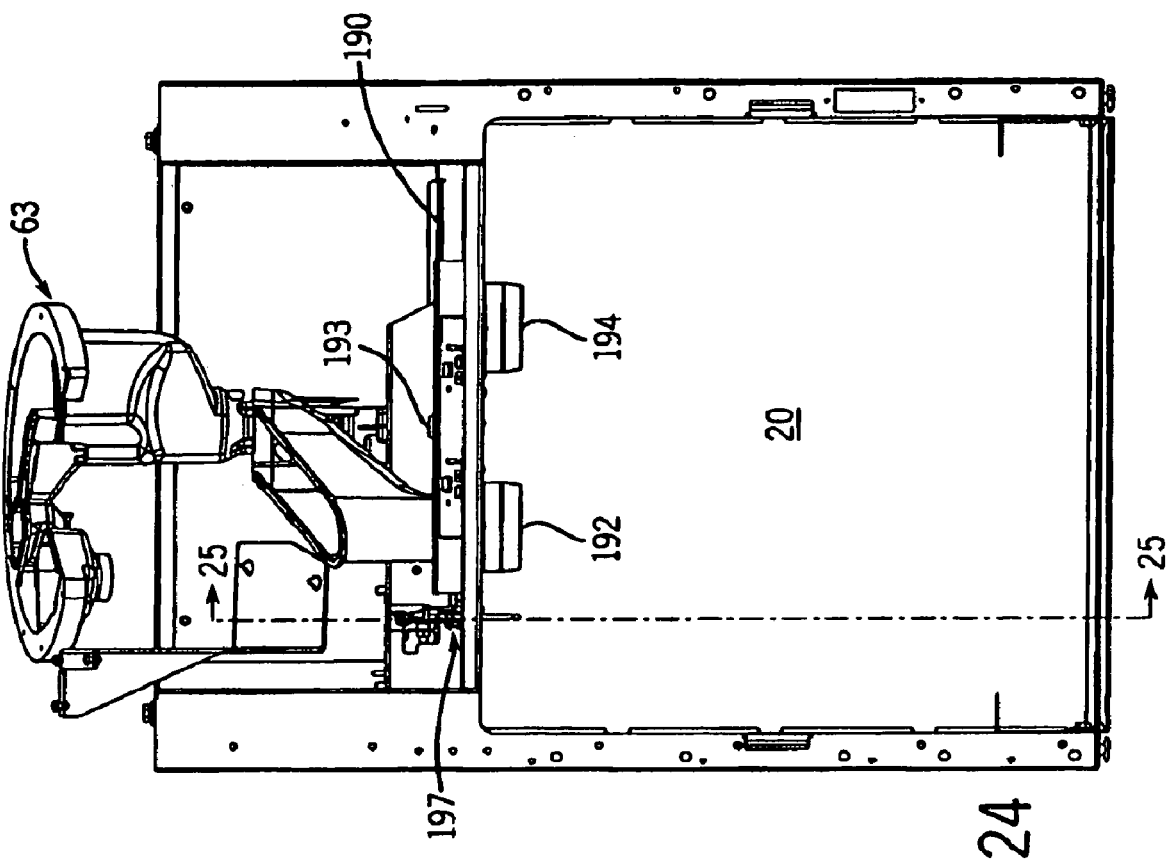
FIG. 24 is a front view of the machine of FIG. 22, with no coin bin received in the lower compartment.
Figure 25:
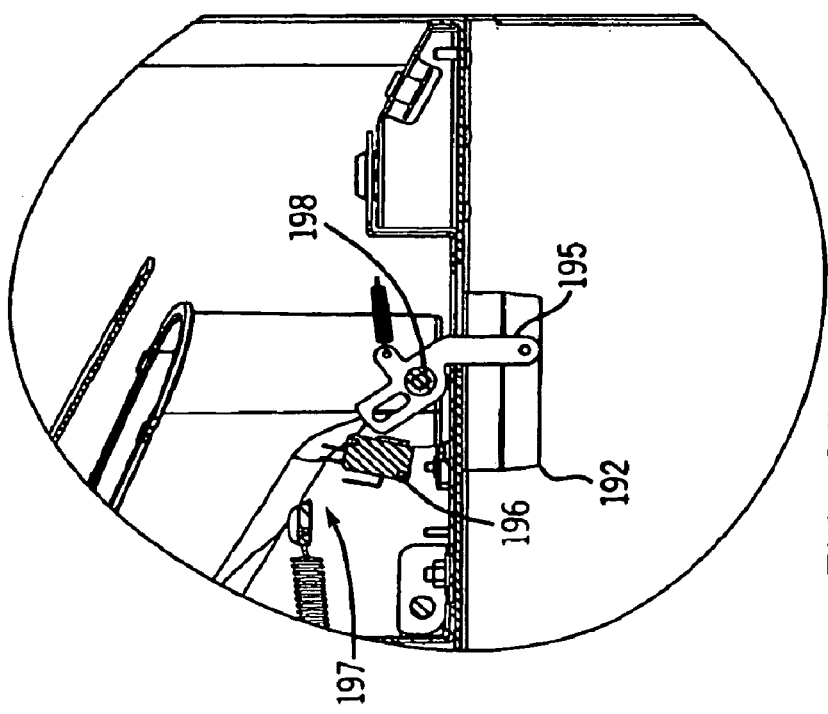
FIG. 25 is a cutaway view taken along line 25-25 of FIG. 24.

Referring now to FIGS. 24 and 25, when the coin collecting machine 10 is empty, the fill tray 190 can be moved to the closed position, but the lever 195 does not contact a bin 122 or 123, does not rotate, and does not activate the switch 196. Referring now to FIGS. 26 and 27, when the bins 122 and 123 are inserted into the lower compartment 20 of the coin collecting machine 10 with the apertures 170 and 172 open, the filler plate 190 is initially in an open position, rotated up, preventing contact with the bin, such that the levers 195 are not rotated to activate the switch 196.

Referring now to FIG. 28, when the bins 122 and 123 are properly positioned in the machine 10, the filler plate 190 can be rotated down by the user, typically through the insertion of the key into the locking element 193, thereby causing the tubular elements 192 and 194 to be received through the associated apertures 170 and 172, such that the tubular elements 192 and 194 extend into the bin, physically locking the bins 122 and 123 to the coin collecting machine 10. As the tubular elements 192 and 194 are inserted into the apertures 170 and 172, the indicator levers 195 contact the lids 125 of the bins 122 and 123, pivot about pivot points 198, activating the associated switches 196. If the apertures 170 and 172 are not open, the filler plate 190 cannot be pushed down a sufficient distance to rotate the levers 195. A controller monitors the signals from the switches 196 and prevents the coin collecting machine 10 from operating until all of the switches 196 are activated, indicating that bins 122 and 123 are appropriately positioned in the coin collecting machine 10 with the apertures 170 and 172 open. Although the machine is described above as a tandem coin collecting machine 10 for receiving two bins 122 and 123, the machine could also be designed to receive a single bin 122.

Referring now to FIG. 29, access to the lower compartment 20 of the coin collecting machine 10 can be provided either from the front or from the rear of the coin collecting machine 10. When access is from the rear, as shown here, the bins 122 and 123 are inserted into and removed from the lower compartment 20 from the back of the machine 10. This arrangement is suitable, for example, when the coin collecting machine is to be positioned adjacent a wall, and access provided to the rear of the machine 10 through the wall. A door, not shown here, can be provided to selectively enclose the rear access to the machine 10.

Referring now to FIGS. 30-37, an alternate embodiment of a handle assembly 228 for use with a coin bin 122 of the present invention is shown. In this embodiment, the handle includes a latching and retaining mechanism for coupling and de-coupling the handle from the coin bin housing.

Referring first to FIG. 30, the handle assembly 228 includes a generally horizontal hand grip 230 at an upper end, and a latching and retaining mechanism 240 for coupling the handle 228 to the bin 122 at the opposing end. An elongate handle member 229, including an upper handle portion 232 and a lower handle portion 234, extends between the hand grip 230 and the latching and retaining mechanism 240, the upper handle portion 232 and lower handle portion 234 meeting at an angle that is selected to allow a coin bin 123 to be moved into and stored in tandem with a second coin bin 122 in coin machine 10, as described above, without interfering with electronics or hardware in the coin machine 10.

Figure 32:
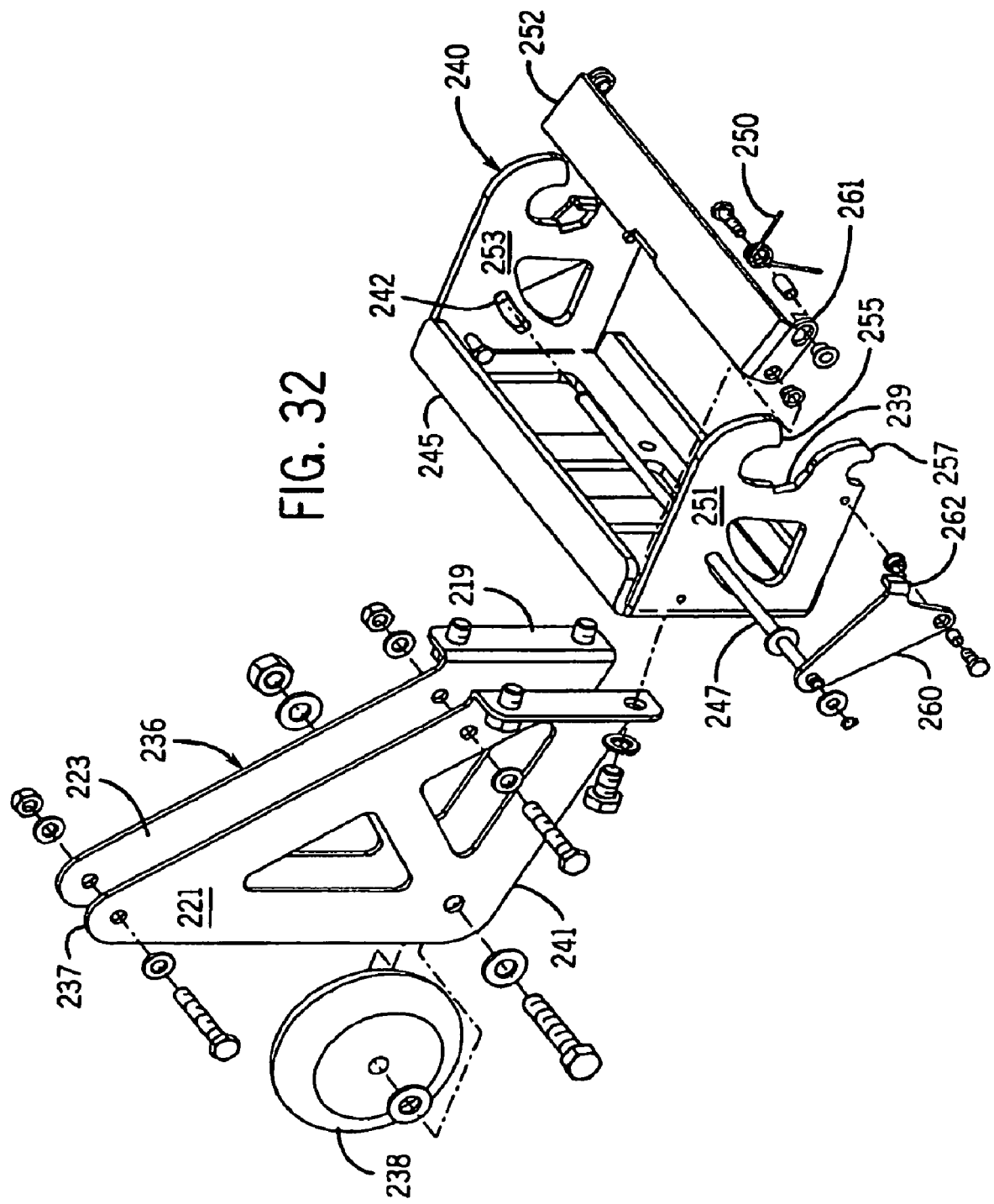
FIG. 32 is an exploded view of the latching element of the handle of FIG. 30.
Figure 35:
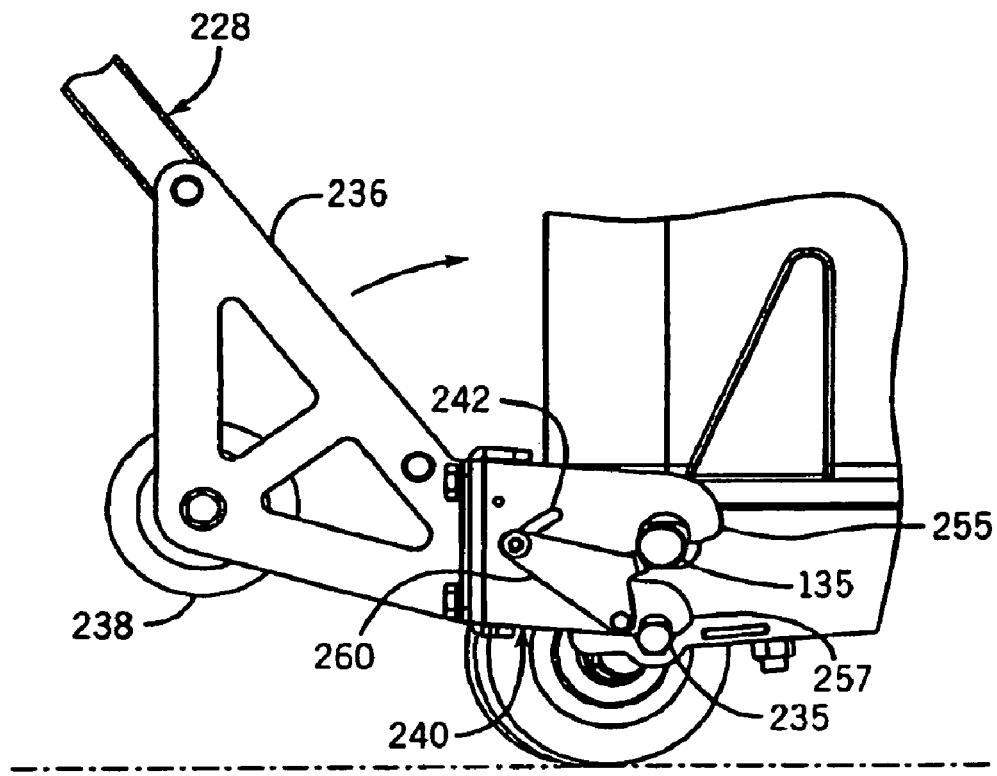
FIG. 35 is a perspective view of the handle of FIG. 30 as it is hooked onto the bin.

Referring now to FIGS. 31 and 32, a generally triangular wheel bracket 236 is coupled between the latching element 240 and lower handle portion 234. The wheel bracket 236 comprises first and second plates 221 and 223 that are coupled together with a handle wheel 238 coupled rotatably between. A first corner 237 of the wheel bracket 236 is coupled to the lower handle portion 234, and a second corner 241 is rotatably coupled to the handle wheel 238. The third corner of the wheel bracket 236 is truncated to provide a flat surface 219 that can be coupled to a front mounting plate 245 of latching and retaining mechanism 240, as described below. The side of the wheel bracket 236 extending between the first corner 237 and the latching and retaining mechanism 240 is generally aligned with the lower handle member 234.

Referring still to FIGS. 31 and 32, the latching and retaining mechanism 240 includes a generally planar front mounting plate 245 that is coupled to the flat surface 219 of the wheel bracket 236. First and second spaced apart arms or coupling plates 251 and 253 extend substantially perpendicular to opposing sides of the front mounting plate 245, and each include an axial slot 242, and a pair of spaced apart hooked retainers, upper and lower hooks 255 and 257 that form a retainer mechanism, and that are sized and dimensioned to be received on corresponding coupling elements on the coin bin wheel assembly, here pins 135 and 235. A notch 239 is provided between the upper and lower hooks 255 and 257. A spring-operated latching mechanism including a latching bracket 260 is rotatably coupled to the latching and retaining mechanism 240 through a fastener 263 at a first end, and to a rod 247 at the opposing end that is sized and dimensioned to be received in the axial slot 242, which acts as a cam surface as described below. A U-shaped hook 262 extends from a side of the latching bracket 260, and is sized and dimensioned to be received in the notch 239 formed between hooks 255 and 257.

Referring still to FIG. 32 and also to FIG. 33, a spring-loaded bar member or pivot bracket 252 is coupled in the latching and retaining mechanism 240 between the coupling plates 251 and 253. The pivot bracket 252 includes a generally planar upper surface, and opposing sides that, when mounted in the latching and retaining mechanism 240, are substantially parallel to the coupling elements 251 and 253. The sides each include an aperture 261 that receives the rod 247 which, as shown in FIG. 34, extends between the axial slots 242 provided in the opposing coupling elements 251 and 253, and through the apertures 261 in opposing sides of the pivot bracket 252. The pivot bracket 252 also includes torsion springs 250 on opposing sides for latching the handle 228 assembly, as described below. Referring still to FIG. 33, the pivot bracket 252 includes a downwardly-extending tongue 254 that extends from the upper surface and that includes an aperture 256. A release mechanism, including a rod 258 is provided inside of the lower portion 234 of the elongate handle member 229, and is coupled to the tongue 254 at a first end and to a knob 272 at the opposing end. The knob 272, in turn, is received in a slot 270 formed in the lower portion 234 of the handle assembly 228 (FIG. 34).

Figure 36:
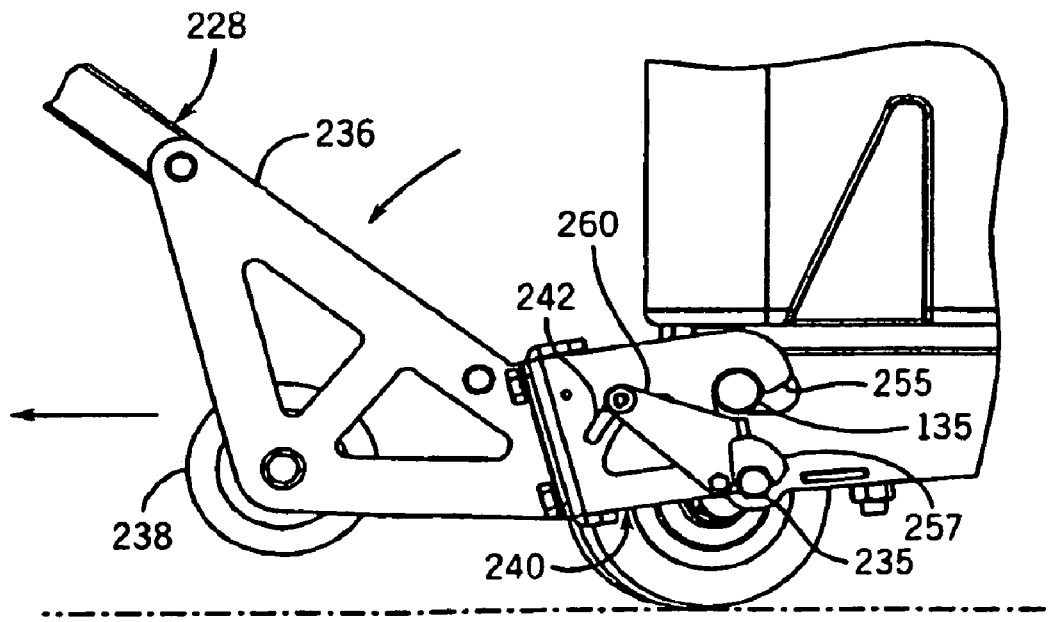
FIG. 36 is a perspective view of the handle as it is latched onto the bin.
Figure 37:
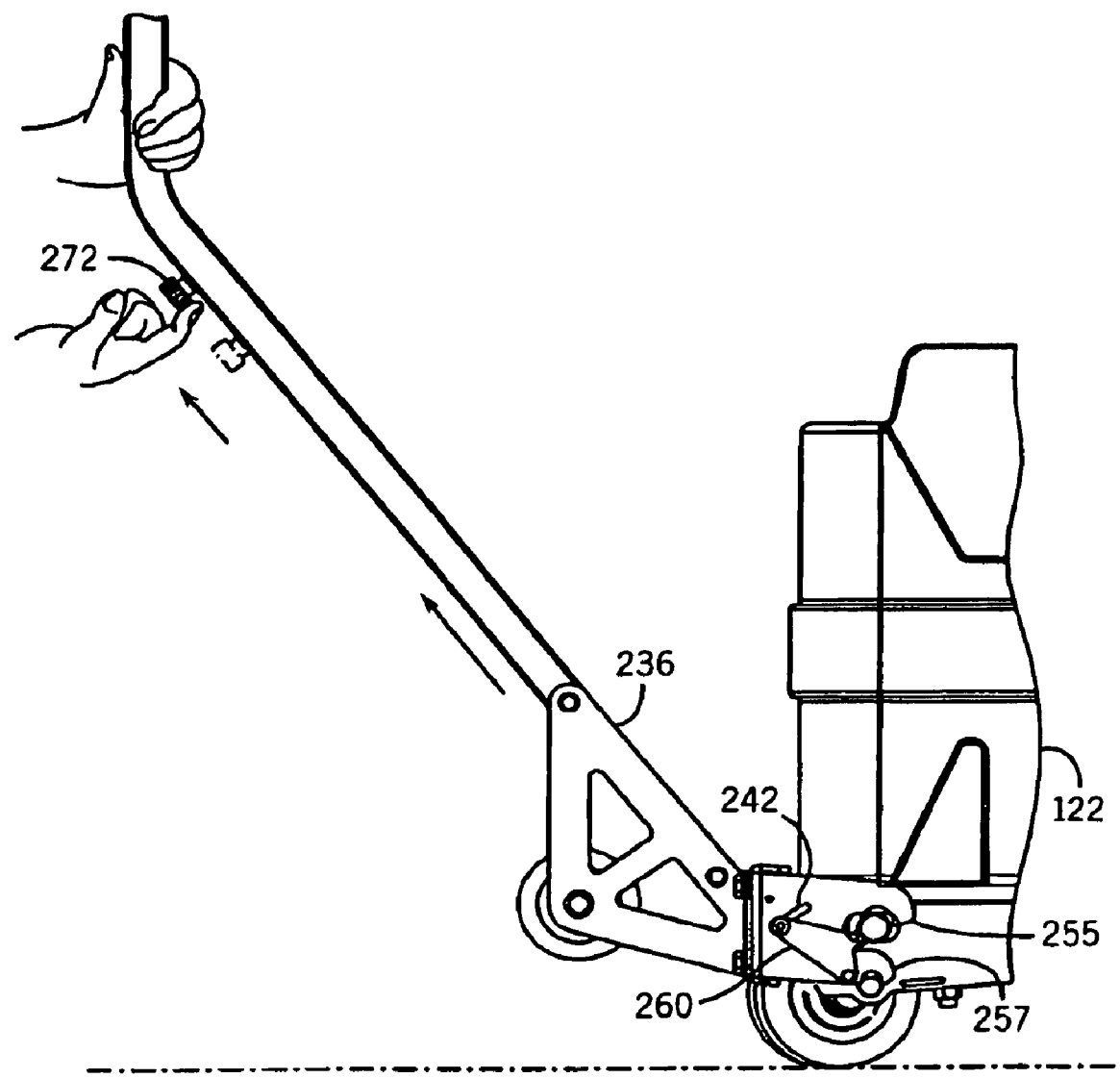
FIG. 37 is a perspective view of the handle, illustrating activation of the release mechanism of FIG. 33 to release the latch.

Referring again to FIG. 32, to attach the handle assembly 228 to the bin 122, the handle assembly 228 is rolled on wheel 238 toward the upper and lower pins 135 and 235 on the wheel assembly 183, and the hooks 255 and 257 are directed onto the pins 135 and 235. Referring now to FIG. 36, when the coupling elements or plates 251 and 253 including hooks 255 and 257 are aligned with the corresponding coupling elements, pins 135 and 235, the handle assembly 228 is raised to move wheel 238 off of the ground. Referring now to FIG. 37, to latch the handle assembly 228 to the bin 122, a user subsequently lowers the handle, causing the rod 247 to move along the slot 242 toward the upper end of the slot 242, and forcing the hook 262 of the latching bracket 260 in the notch 239 between the hooks 255 and 257 to the latched position. When latched, the springs 250 in the pivot bracket are biased to retain the latching bracket 260 in position, locking the handle 228 to the bin 122. The handle 228, therefore, is tightly engaged to the wheel assembly 183, and can be used as a lever to easily move the coin bin.

Referring now to FIG. 37, to release the latching mechanism 260, the user pulls the knob 272 upward through the slot 276, forcing the rod 258 (FIG. 33) connected to the tongue 254 to pivot the pivot bracket 252 upward, releasing the springs 250, and unlatching the latching bracket 260. The latching element 240 can then be lifted from the pins 135 and 235.

It should be understood that the methods and apparatuses described above are only exemplary and do not limit the scope of the invention, and that various modifications could be made by those skilled in the art that would fall under the scope of the invention. For example, although a specific coupling element comprising hooks and pins is described above, it will be apparent that there are a number of ways for coupling the latching element to the coin bin, and that any of these could be used in the present invention. Additionally, although hooks are shown provided on the bin and pins on the wheel assembly, the orientation could be reversed. Furthermore, although the handle is shown coupled to the wheel assembly, it is also possible to couple the handle to the bin housing. Various other methods for coupling the handle to the bin will be apparent to those of skill in the art.

Additionally, although two apertures for receiving coins are described above, it will be apparent that other numbers of apertures can also be used, and that the number of apertures can be selected to distribute the coins evenly in the bin. Furthermore, although a combination plastic and metal construction is described, it will be apparent that the bin can be constructed either entirely of plastic materials, entirely of metal materials, or of a combination of both. The bin can be constructed from steel, a rotationally molded plastic, or other materials that are sufficiently strong for retaining the coins. Furthermore, although the coin bin is described above for use in a coin collecting machine, it will be apparent that the coin bin described herein can be used in many applications, including vending machines, retail and business coin counting machines, in banking applications, and in various other capacities. To apprise the public of the scope of this invention, the following claims are made:

We claim:

1. A moveable coin bin assembly for collecting and transporting a volume of coins, the moveable coin bin assembly comprising:

a coin bin housing for containing a volume of coins, the coin bin housing being supported by a wheel assembly for movement;

a handle assembly including an elongated handle having an upper end portion for gripping and a lower extending portion leading to a lower end portion; and the handle assembly further comprising a latching and retaining mechanism extending forwardly from the lower end portion of the handle assembly;

the handle assembly including a wheel mounted to the lower end portion of the handle assembly and positioned behind the latching and retaining mechanism;

wherein the wheel provides a rolling motion for the handle assembly along a floor surface in which the wheel assembly supporting the coin bin housing is engaged by the latching and retaining mechanism;

wherein after the wheel assembly has been first engaged by the latching and retaining mechanism, the handle assembly including the wheel is liftable in an upward direction off the floor surface and is then moveable in a downward direction to actuate the latching portion of the latching and retaining mechanism to secure the latching and retaining mechanism to the wheel assembly; and wherein the wheel assembly includes a linking element that is mounted for sliding underneath the coin bin housing, wherein the latching and retaining mechanism is coupled to a pin on the slideable linking element by a first hook that pivots around a second hook retained by a stationary pin on the wheel assembly; and wherein the linking element is slideable from a non-braking position to a braking position in response to pivoting of the handle assembly, with the coin bin housing being lowered into a braking position where a weight of the coin bin housing rests on at least one pair of wheels in the wheel assembly.

2. The moveable coin bin assembly of claim 1, wherein the slideable linking element is slideable from a braking position to a non-braking position to lift the coin bin housing a distance above the pair of wheels to release the pair of wheels and the wheel assembly for movement of the coin bin assembly.

3. The moveable coin bin assembly as recited in claim 2, wherein the wheel assembly includes a slot for receiving an axle, and wherein movement of the handle between the braked position and the brake release position causes the axle to move in the slot between a non-braking position supporting the coin bin housing above the wheels and a braking position where a weight of the coin bin housing is bearing on at least one pair of the wheels.

4. The moveable coin bin assembly as recited in claim 3, wherein the slot includes a substantially vertical portion and a diagonal portion.

5. The moveable coin bin assembly as recited in claim 3, wherein the wheel assembly includes plates that are disposed beneath the coin bin housing for contacting a surface of the pair of wheels being braked.

* * * * *